United States Patent
Nagaoka

(10) Patent No.: US 6,987,620 B2
(45) Date of Patent: Jan. 17, 2006

(54) LIGHT WEIGHT HEAD MOUNTED IMAGE DISPLAY DEVICE

(75) Inventor: Toshiyuki Nagaoka, Akishima (JP)

(73) Assignee: Olympus Corporation, Tokyo (JP)

( * ) Notice: Subject to any disclaimer, the term of this patent is extended or adjusted under 35 U.S.C. 154(b) by 93 days.

(21) Appl. No.: 10/766,542

(22) Filed: Jan. 29, 2004

(65) Prior Publication Data
US 2004/0190150 A1  Sep. 30, 2004

Related U.S. Application Data

(63) Continuation of application No. 09/916,196, filed on Jul. 27, 2001, now Pat. No. 6,697,200.

(30) Foreign Application Priority Data
Aug. 1, 2000 (JP) .............................. 2000-237643

(51) Int. Cl.
*G03H 1/00* (2006.01)
*G02B 27/14* (2006.01)
*G09G 5/00* (2006.01)

(52) U.S. Cl. ............................. 359/630; 359/13; 345/8

(58) Field of Classification Search ................ 359/630, 359/631, 632, 638, 640, 13, 14; 345/7–9
See application file for complete search history.

(56) References Cited

U.S. PATENT DOCUMENTS

| | | | |
|---|---|---|---|
| 4,026,641 A | 5/1977 | Bosserman et al. | |
| 4,869,575 A | * | 9/1989 | Kubik .................... 359/630 |
| 5,305,124 A | 4/1994 | Chern et al. | |
| 5,513,041 A | 4/1996 | Togino | |
| 5,706,136 A | 1/1998 | Okuyama et al. | |
| 5,734,505 A | 3/1998 | Togino et al. | |
| 5,864,326 A | 1/1999 | Rallison | |
| 5,933,279 A | 8/1999 | Yamazaki | |
| 5,949,583 A | 9/1999 | Rallison et al. | |
| 6,222,677 B1 | 4/2001 | Budd et al. | |
| 6,445,507 B2 | 9/2002 | Togino et al. | |
| 2001/0048561 A1 | 12/2001 | Heacock | |
| 2002/0036831 A1 | 3/2002 | Inoguchi et al. | |

FOREIGN PATENT DOCUMENTS

JP           08-240773         9/1996

* cited by examiner

*Primary Examiner*—Georgia Epps
*Assistant Examiner*—Alicia M. Harrington
(74) *Attorney, Agent, or Firm*—Pillsbury Winthrop Shaw Pittman LLP

(57) ABSTRACT

An image display element 1 and an observation optical system 2 which forms an exit pupil 4 for observation of an image displayed on the image display element are included, wherein the observation optical system 2 has at least one surface $2_1$ that has a lens function, and the following condition (1) is satisfied:

$$0.1 < P \cdot PD \cdot ZD < 5 \quad (1)$$

where P is a pixel pitch (in μm) of the image display element, PD is a diameter (in mm) of the exit pupil, and ZD is a distance (in mm) from the display surface of the image display element to the first surface having a lens function. Whereby, weight reduction is achieved while good image quality is maintained regarding an image display apparatus that is used for magnifying observation of an image on a display element.

4 Claims, 20 Drawing Sheets

FIG.25
FIG.26
FIG.27
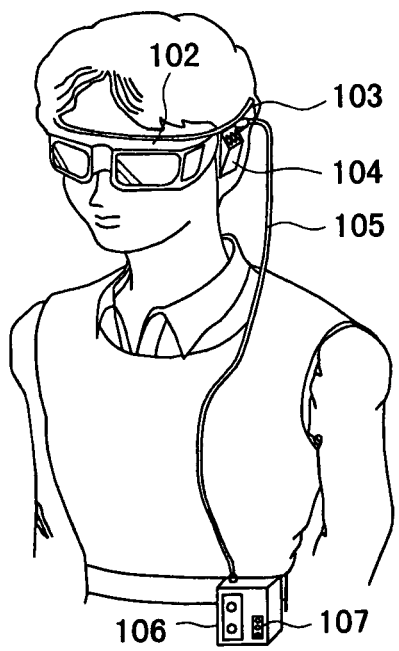
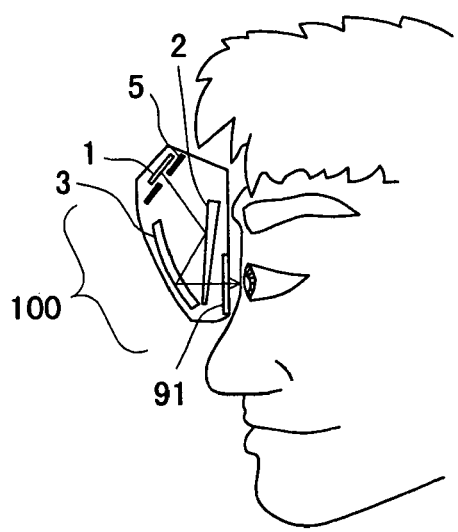
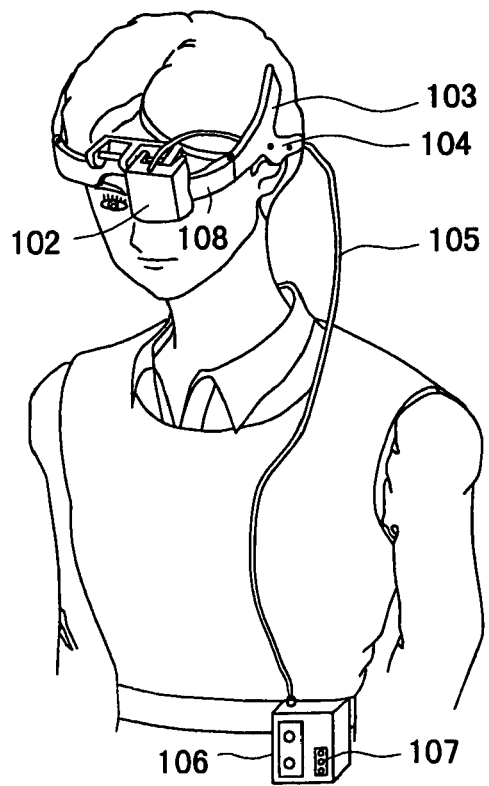

(EXAMPLE) WHERE MEDIUM IS AIR WITH n=1:
$$\Phi_0{}^{2P} = -r_2 - r_1 < 0$$

LIGHT WEIGHT HEAD MOUNTED IMAGE DISPLAY DEVICE

This is a continuation of U.S. patent appl. Ser. No. 09/916,196, filed Jul. 27, 2001, now U.S. Pat. No. 6,697,200 which claims priority to Japanese Patent Appl. No. 2000-237643, filed Aug. 1, 2000.

BACKGROUND OF THE INVENTION

1) Field of the Invention

The present invention relates to an image display apparatus having an observation optical system.

2) Description of Related Art

In recent years, development has been energetically made for image display apparatuses, specifically for those to be held on the head or face of individuals for entertaining them with a wide-screen image. Conventionally, as head-mount image display apparatuses, there are known a type in which an image on an image display element such as a CRT is transmitted via an image transmitting element to an object surface, where the image is projected in the air by a toric reflecting surface (U.S. Pat. No. 4,026,641), and a type in which an image displayed on a liquid crystal display device (LCD) is once imaged in the air via a refraction-type relay optical system and then is introduced into an eye of an observer via an eyepiece optical system composed of a concave mirror arranged in a decentered manner (Japanese Patent Application Preliminary Publication (KOKAI) No. Hei 6-294943).

However, these types of the head-mount image display apparatus are not suitable for long-time use as being held on the head or face, because their optical systems are large and heavy. Therefore, it is desired to reduce the weight of the apparatus while maintaining good image quality.

Also, in accordance with recent popularization of cellular phone and portable intelligent terminal, requirements for wide-screen view, via an image display apparatus, of graphics or text data on a cellular phone or portable intelligent terminal have grown. For application to a cellular phone or the like also, it is desired to reduce weight of the apparatus while maintaining good image quality because users would personally carry the cellular phones or the like with them in their pockets or bags.

As conventional resolution examples for achieving weight reduction, observation optical systems that are constituted with a combination of thin platelike optical members (Japanese Patent Application Preliminary Publication (KOKAI) No. Hei 8-234137, Japanese patent Application Preliminary Publication (KOKAI) No. 8-240773) are known.

Although such an observation optical system is allowed to have a lightweight structure, it involves a problem in having difficulty in providing good image quality, because dust is easily caught on reflecting surfaces thereof to cause flare or the like.

In reference to FIGS. 29–30, this problem is explained. Each of observation optical systems shown in FIGS. 29, 30 is configured to reflect bundles of rays emergent from an image display element 1 such as LCD at a reflecting surface $2_1$ of an optical member 2. Since the observation optical system as shown in FIG. 29 uses a prism, there is no chance that dust or flaws would damage the reflecting surface $2_1$ during assembling or transportation. In contrast, since the observation optical system as shown in FIG. 30 is constituted with a combination of thin platelike optical members for the purpose of weight reduction, the reflecting surface $2_1$ is apt to be damaged with dust or flaws and thus assembling and transportation is difficult.

SUMMARY OF THE INVENTION

Therefore, an object of the present invention is to achieve weight reduction while maintaining good image quality in an image display apparatus that is used for magnifying observation of an image formed on a display element.

An image display apparatus according to the first aspect of the present invention includes an image display element and an observation optical system which forms an exit pupil for observation of an image displayed on the image display element, wherein the observation optical system has at least one surface having a lens function, and the following condition (1) is satisfied:

$$0.1 < P \cdot PD \cdot ZD < 5 \qquad (1)$$

where P is a pixel pitch (in $\mu$m) of the image display element, PD is a diameter (in mm) of the exit pupil, and ZD is a distance (in mm) from the display surface of the image display element to a first surface having a lens function.

For example, in the optical system provided with an optical member similar to that shown in FIG. 30, it is desirable that Condition (1) is satisfied for the purpose of obtaining good image quality with optical performance being little affected by dust or flaws that would damage the reflecting surface during assembling or transportation. In FIG. 1, the reference numeral 1 represents an image display element such as a LCD, the reference 2 represents a first optical member, the reference numeral $2_1$ represents a first reflecting surface, and the reference numeral 4 represents an exit pupil.

Light emergent from the image display element 1 has a relatively small beam diameter as it is incident on the first reflecting surface $2_1$, and the beam diameter is widened after the light is reflected from the reflecting surface $2_1$. Therefore, if dust is caught on the first reflecting surface $2_1$, a blurred image of the dust is projected on the pupil as enlarged for observation, to degrade image quality.

In this case, under the condition where a dust particle with the same size is caught on the reflecting surface $2_1$, a finer pixel pitch of the image display element 1 causes the blurred image of the dust particle to be more conspicuous because resolution of the image is finer, while a coarser pixel pitch makes the image of the dust particle to be less conspicuous because resolution over the entire image is coarser. Also, a larger diameter of the exit pupil 3, or a larger value of NA causes a larger beam diameter at the first reflecting surface, and thus the dust particle is projected relatively small to be less conspicuous. Also, a longer distance from the display surface of the image display element 1 to the first surface having a lens function causes a larger beam diameter at the first reflecting surface, and thus the dust particle is projected relatively small to be less conspicuous.

Considering the discussions set forth above collectively, the applicant has revealed that satisfaction of Condition (1) is desirable in the image display apparatus according to the first aspect.

If Condition (1) is satisfied, it is possible to achieve good image quality because dust, which would be caught on the reflecting surface during fabrication, is inconspicuous as observed.

Failing to reach the lower limit value, 0.1 of Condition (1) is not preferable, because it degrades image quality with dust caught on the reflecting surface being conspicuous as a large image. Exceeding the upper limit value, 5 of Condition (1) is not preferable, because such a configuration is impractical with bulkiness of the optical system or with degraded image quality over the entire field.

Also, an image display apparatus according to the second aspect of the present invention includes an image display element and an observation optical system which forms an exit pupil for observation of an image displayed on the image display element, wherein the observation optical system includes at least one diffraction element which is given a lens function by diffraction effect, and an optical element satisfying the following condition (2) is used in observation:

$$a<90 \qquad (2)$$

where a is a transmittance (in %) for a wavelength range of 500 nm–650 nm.

As measures to achieve weight reduction of the observation optical system, use of a diffraction element, which has a lens function in spite of its thin structure, is known. As a reflection type- or transmission type-diffraction element, a relief hologram or a volume hologram is available. However, a diffraction element involves a problem of flare caused by undesired order rays. Therefore, if light from bright light source such as the sun or an electric lamp is incident on a diffraction element, for example, flare caused at the diffraction element prevents a good image from being formed.

Therefore, in the image display apparatus according to the second aspect, an optical member which satisfies Condition (2) is used for the purpose of attenuating amount of light from the light source, which would be the cause of flare.

Satisfaction of Condition (2) allows good image to be obtained with flare by the diffraction element being reduced.

Also, an image display apparatus according to the third aspect of the present invention includes an image display element and an observation optical system which forms an exit pupil for observation of an image displayed on the image display element, wherein the observation optical system includes a first unit having at least one prism member with a positive refracting power and a second unit, and the first unit is configured to be movable for alignment of optical axes.

For weight reduction of the apparatus, it is effective to separate the optical member having a positive refracting power into a first unit having a positive refracting power and a second unit, with a space between the first unit and the second unit being filled with air.

However, if such a two-unit configuration is employed, the optical axes of the units are likely to be inconsistent. Also, since sensitivity to inconsistency of the optical axes is large, it sometimes is difficult to obtain good image quality.

Therefore, according to the third aspect, the first unit including at least one prism member with a positive refracting power is configured to be movable.

According to the configuration of the present invention, the optical axes can be aligned, in assembling, by movement of the first unit including the prism member, thereby to achieve good imaging performance.

Also, an image display apparatus according to the fourth aspect of the present invention includes an image display element and an observation optical system which forms an exit pupil for observation of an image displayed on the image display element, wherein the observation optical system includes a first unit that includes at least one prism member having a positive refracting power and a second unit having a positive refracting power, a primary image surface is formed between the first unit and the second unit, and the following condition (3) is satisfied:

$$0.1<P\cdot PD\cdot ZDD<5 \qquad (3)$$

where P is a pixel pitch (in μm) of the image display element, PD is a diameter (in mm) of the exit pupil, and ZDD is a distance long the optical axis from the primary image surface to an optical element that is located closest to the primary image surface.

An observation optical system that forms a primary image surface in the path has a problem of optical performance degradation caused by dust or flaws on an optical element disposed in the vicinity of the primary image surface where the beam of rays is relatively narrow.

If dust is caught on an optical element disposed in the vicinity of the primary image surface where the beam diameter is narrow, a blurred image of the dust is projected relatively large for observation and thus degrades the image quality.

In this case, under the condition where a dust particle with the same size is caught on the surface, a coarser pixel pitch the image display element such as a LCD makes the image of the dust particle to be less conspicuous because resolution over the entire image is coarser, while a finer pixel pitch causes the blurred image of the dust particle to be more conspicuous because resolution of the image is finer. Also, a larger diameter of the exit pupil, or a larger value of NA causes a larger beam diameter at the first reflecting surface, and thus the dust particle is projected relatively small to be less conspicuous. Also, a longer distance from the primary image surface to the optical element disposed closest to the primary image surface causes a larger beam diameter at the first reflecting surface, and thus the dust particle is projected relatively small to be less conspicuous.

Considering the discussions set forth above collectively, the applicant has revealed that satisfaction of Condition (3) is desirable in the image display apparatus according to the fourth aspect.

If Condition (3) is satisfied, it is possible to achieve good image quality because dust, which would be caught on the reflecting surface during fabrication, is inconspicuous as observed.

Failing to reach the lower limit value, 0.1 of Condition (3) is not preferable, because it degrades image quality with dust caught on the reflecting surface being conspicuous as a large image. Exceeding the upper limit value, 5 of Condition (3) is not preferable, because such a configuration is impractical with bulkiness of the optical system or with degraded image quality over the entire field.

Also, an image display apparatus according to the fifth aspect of the present invention includes an image display element and an observation optical system which forms an exit pupil for observation of an image displayed on the image display element, wherein the observation optical system includes a first unit having a positive refracting power and a second unit, and the following condition (4) is satisfied:

$$0.02\times 10^{-2}<\alpha\cdot P<2\times 10^{-2} \qquad (4)$$

where α is a field angle (in rad.) of the observation optical system, and P is a pixel pitch (in μm) of the image display element.

In an observation optical system of an image display apparatus including a first unit having a positive refracting power and a second unit, it is desirable that Condition (4) is satisfied for the purpose of achieving high image quality while maintaining compact size of the apparatus. In an image display apparatus, a wider field angle can provide more real ambience of the image, while an extremely wide field angle raises a problem of size increase of the observation optical system. Also, a smaller pixel pitch is desirable in view of obtaining a higher image quality, while an extremely small pixel pitch raises a problem of increase in number of lenses required for compensation of aberrations generated in the observation optical system, and accordingly increase in size of the entire image display apparatus.

Therefore, according to the fifth aspect, it is desirable to satisfy Condition (4). Satisfaction of Condition (4) allows the apparatus to achieve high image quality with its size being maintained compact.

Failing to reach the lower limit value, $0.02 \times 10^{-2}$ of Condition (4) is not preferable, because it renders the field angle narrow or the observation optical system large. Exceeding the upper limit value, $2 \times 10^{-2}$ of Condition (4) is not preferable, because it prevents a high-definition image or renders the observation optical system large.

Also, according to the fifth aspect, it is more desirable that the following condition (5) is satisfied in addition to Condition (4):

$$0.05 < P \cdot LD < 2 \tag{5}$$

where LD is a distance (in mm) taken along the image center between the last surface (a surface of the observation optical system farthest from the exit pupil along the path) of the observation optical system and the exit pupil.

Satisfaction of Condition (5) allows the apparatus to be made compact while good image quality being maintained.

Failing to reach the lower limit value, 0.05 of Condition (5) is not preferable, because it requires a infeasible value of the distance between the last surface of the observation optical system and the exit pupil renders the observation optical system large.

Exceeding the upper limit value, 2 of Condition (5) is not preferable, because it prevents a high-definition image or renders the observation optical system large.

An image display apparatus according to the sixth aspect of the present invention includes an image display element, an observation optical system which forms an exit pupil for observation of an image displayed on the image display element, and a clip section, wherein the observation optical system has a positive refracting power, and a frame member provided with said observation optical system is integrally formed with the clip section.

Also, according to the first aspect, it is much desirable to satisfy the following condition (6), further limiting Condition (1):

$$0.5 < P \cdot PD \cdot ZD < 2 \tag{6}$$

Also, according to the second aspect, it is much desirable to satisfy the following condition (7), further limiting Condition (2):

$$a < 50 \tag{7}$$

Also, according to the fourth aspect, it is much desirable to satisfy the following condition (8), further limiting Condition (3):

$$0.5 < P \cdot PD \cdot ZDD < 2 \tag{8}$$

Also, according to the fifth aspect, it is much desirable to satisfy the following condition (9), further limiting Condition (4):

$$0.1 \times 10^{-2} < \alpha \cdot P < 1 \times 10^{-2} \tag{9}$$

Also, according to the fifth aspect, it is much desirable to satisfy the following condition (10), further limiting Condition (5):

$$0.1 < P \cdot LD < 1 \tag{10}$$

Also, according to the first aspect, it is preferable that the observation optical system includes a first optical member having a first surface that has an action of reflecting bundles of rays from the image display element and a second optical member having an action of further reflecting the bundles of rays reflected from the first surface and that a space between the first optical member and the second optical member is filled with gas.

Replacing a medium in a space between the first optical member and the second optical member with gas can reduce the weight by the difference.

Also, in the image display apparatus according to the first aspect, it is preferable that at least one surface of the observation optical system is composed of a diffraction element which is given a lens function by diffraction effect.

Use of a diffraction element facilitates reduction in size and weight and allows chromatic aberration generated at the remaining surfaces of the observation optical system to be cancelled.

Also, according to the first aspect, it is preferable that at least one surface of the observation optical system has a curved surface shape to exert a power on bundles of rays, and that the curved surface shape is configured as a rotationally asymmetric surface shape to compensate aberrations generated by decentering.

Also, according to the second aspect, it is preferable that at least one another optical element disposed between the exit pupil and the optical member is a diffraction element.

Also, according to the second aspect, it is preferred that the observation optical system includes at least one prism member, that the prism member has an entrance surface via which bundles of rays emergent from the image display element enter the prism member, at least one reflecting surface which reflects the bundles of rays inside the prism member, and an exit surface via which the bundles of rays exit out of the prism member, that the at least one reflecting surface has a curved surface shape to exert a power on bundles of rays, and that the curved surface shape is configured as a rotationally asymmetric surface shape to compensate aberrations generated by decentering.

Also, according to the third aspect, it is preferable that at least one surface in the observation optical system is configured as an optical element that is given a lens function by diffraction effect.

Also, according to the third aspect, it is preferable that at least one prism member in the observation optical system has an entrance surface via which bundles of rays emergent from the image display element enter the prism, at least one reflecting surface which reflects the bundles of ryas inside the prism member, and an exit surface via which the bundles of rays exit out of the prism member, that the at least one reflecting surface has a curved surface shape to exert a power on the bundles of rays, and that the curved surface shape is configured as a rotationally asymmetric surface shape to compensate aberrations generated by decentering.

Also, according to the third aspect, it is preferable that the second unit has a positive refracting power.

Also, according to the third aspect, it is preferable that, for alignment of an optical axis of the image display element, an optical axis of the first unit and an optical axis of the second unit, the first unit is adjusted so that, upon a first pinhole being arranged on an exit surface side of the first unit and being aligned with the optical axis of the first unit and a second pinhole being arranged on an exit surface side of the second unit and being aligned with the optical axis of the second unit, and then upon a central portion of the image display element being made to flash as a point light source, the point light source is observable through the first pinhole and the second pinhole.

Also, according to the third aspect, the image displayed on the image display element may be photographed by a photographing optical system disposed on an exit pupil side.

Also, according to the third aspect, it is preferable that the first unit is fixed with adhesive after alignment of the optical axes.

Also, according to the fourth aspect, it is preferable that a member that has an action of interrupting stray light from the image display element is disposed between the image display element and the exit pupil.

Also, according to the fourth aspect, it is preferable that at least one flare stop is disposed between the first unit and the second unit.

Also, according to the fourth aspect, it is preferable that at least one prism member of the observation optical system has an entrance surface via which bundles of rays emergent from the image display element enter the prism member, at least one reflecting surface which reflects the bundles of rays inside the prism member, and an exit surface via which the bundles of rays exit out of the prism member, that the at least one reflecting surface has a curved surface shape to exert a power on bundles of rays, and that the curved surface shape is configured as a rotationally asymmetric surface shape to compensate aberrations generated by decentering.

Also, according to the fifth aspect, it is preferable that the observation optical system includes a first unit having a positive refracting power and a second unit.

In this configuration, it is preferable that the first unit includes at least one prism member having a positive refracting power, that the prism member has an entrance surface via which bundles of rays emergent from the image display element enter the prism member, at least one reflecting surface which reflects the bundles of rays inside the prism member, and an exit surface via which the bundles of rays exit out of the prism member, that the at least one reflecting surface has a curved surface shape to exert a power on bundles of rays, and that the curved surface shape is configured as a rotationally asymmetric surface shape to compensate aberrations generated by decentering.

Also, in this configuration, it is preferable that the second unit has a positive refracting power.

Also, according to the fifth aspect, it is preferable that at least one surface in the observation optical system is an optical element that is given a lens function by diffraction effect.

Also, according to the sixth aspect, it is preferable that the observation optical system includes a first unit having a positive refracting power and a second unit.

In this configuration, it is preferable that the first unit includes at least one prism member having a positive refracting power, that the prism member has an entrance surface via which bundles of rays emergent from the image display element enter the prism, at least one reflecting surface which reflects the bundles of rays inside the prism member, and an exit surface via which the bundles of rays exit out of the prism, that the at least one reflecting surface has a curved surface shape to exert a power on bundles of rays, and that the curved surface shape is configured as a rotationally asymmetric surface shape to compensate aberrations generated by decentering.

Also, in this configuration, it is preferable that the second unit has a positive refracting power.

Also, according to the sixth aspect, it is preferable that at least one surface in the observation optical system is a diffraction optical element.

Also, a rotationally asymmetric surface used in the present invention may be configured as any one of an anamorphic surface, a toric surface, and a free curved surface that defines only one plane of symmetry. Specifically, the surface is preferably configured as a free curved surface that defines only one plane of symmetry.

Also, in the case where a prism member is used in the observation optical system, a reflecting surface provided on the prism member may be configured as a plane-symmetric free curved surface defining only one plane of symmetry.

This and other objects as well as features and advantages of the present invention will become apparent from the following detailed description of the preferred embodiments when taken in conjunction with the accompanying drawings.

BRIEF DESCRIPTION OF THE DRAWINGS

FIG. 7A is a sectional view of an essential portion to schematically show configuration of the optical members, FIG. 7B is a perspective views to show the outline of the image display apparatus, and FIG. 7C is an explanatory view to show the situation where alignment of optical axes are made.

FIG. 25 is a view of a head-mount type binocular image display apparatus using the observation optical system according to the present invention, as it is fit to the head of an observer.

FIG. 26 is a sectional view of the image display apparatus shown in FIG. 25.

FIG. 27 is a view of a head-mount type monocular image display apparatus using the observation optical system according to the present invention, as it is fit to the head of an observer.

DETAILED DESCRIPTION OF THE PREFERRED EMBODIMENTS

Figure 1:
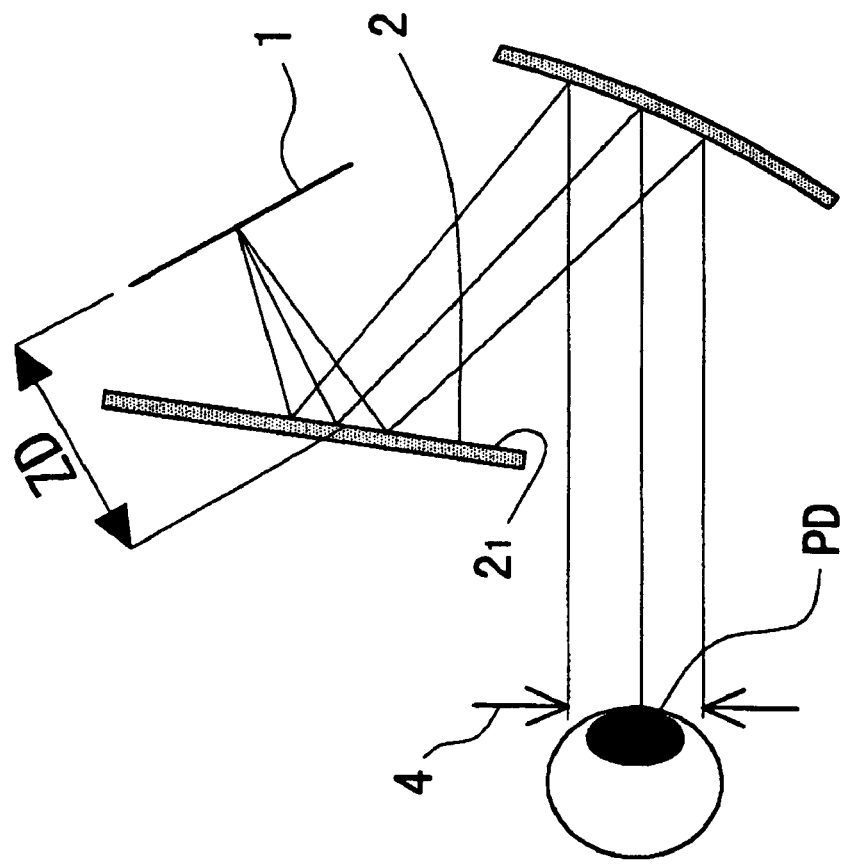
FIG. 1 is a view to explain the principle of the image display apparatus according to the present invention.

Preceding the descriptions of the individual embodiments, detailed explanation is made of the structure and arrangement of optical surfaces used in the present invention.

In the image observation optical system according to the present invention, the axial chief ray is defined as a ray travelling from the center of the exit pupil through the center of the image display element. The optical axis, which is defined by the straight-line portion of the axial chief ray from the center of the exit pupil to the first surface of an optical member, is defined as Z axis. The axis that intersects Z axis at right angles and that is parallel with a plane of the figure sheet is defined as Y axis. The axis that intersects Z axis at right angles and that intersects Y axis at right angles is defined as Z axis. The center of the exit pupil is determined as the origin of the coordinate system for the observation optical system of the present invention. Also, according to the present invention, surface arrangement numbers are assigned in order from the exit pupil through the image display element to conform to the reverse ray tracing. A direction of the axial chief ray from the exit pupil toward the image display element is defined as a positive direction of Z axis. A direction of Y axis that is toward the image display element is defined as a positive direction of Y axis. A direction of X axis that forms a right-hand system along with Y axis and Z axis is defined as a positive direction of Y axis.

Here, a free curved surface used in the present invention is defined by the following equation (11) where Z axis appearing therein is the axis of the free curved surface:

$$Z = cr^2/\{1 + \sqrt{1-(1+k)c^2r^2}\} + \sum_{j=2}^{66} c_j X^m Y^n \quad (11)$$

The first term of Equation (11) expresses the spherical surface component. The second term of Equation (11) expresses the free curved surface component. In the term of the spherical surface component, c represents a curvature at the vertex, k represents a conic constant, and $r = \sqrt{X^2+Y^2}$.

The term of the free curved surface component is expanded as shown in the following equation (12):

$$\sum_{j=2}^{66} C_j X^m Y^n = \quad (12)$$

$$C_2 X + C_3 Y +$$

$$C_4 X^2 + C_5 XY + C_6 Y^2 +$$

$$C_7 X^3 + C_8 X^2 Y + C_9 XY^2 + C_{10} Y^3 +$$

$$C_{11} X^4 + C_{12} X^3 Y + C_{13} X^2 Y^2 + C_{14} XY^3 + C_{15} Y^4 +$$

$$C_{16} X^5 + C_{17} X^4 Y + C_{18} X^3 Y^2 + C_{19} X^2 Y^3 + C_{20} XY^4 + C_{21} Y^5 +$$

$$C_{22} X^6 + C_{23} X^5 Y + C_{24} X^4 Y^2 + C_{25} X \cdot Y^3 + C_{26} X^2 Y^4 + C_{27} XY^5 +$$

$$C_{28} Y^6 + C_{29} X^7 + C_{30} X^6 Y + C_{31} X^5 Y^2 + C_{32} X^4 Y^3 + C_{33} X^3 Y^4 +$$

$$C_{34} X^2 Y^5 + C_{35} XY^6 + C_{36} Y^7 \ldots$$

where $C_j$ (j is integer equal to or greater than 2) is a coefficient.

In general, a free curved surface as expressed above does not have a plane of symmetry along X-Z plane or along Y-Z plane. However, according to the present invention, upon all terms with odd-numbered powers of X being nullified, the free curved surface can define only one plane of symmetry that is parallel to Y-Z plane. Such a free curved surface is obtained, for example, by setting values of the coefficients $C_2$, $C_5$, $C_7$, $C_9$, $C_{12}$, $C_{14}$, $C_{16}$, $C_{18}$, $C_{20}$, $C_{23}$, $C_{25}$, $C_{27}$, $C_{29}$, $C_{31}$, $C_{33}$, $C_{35}$ . . . of the terms in Equation (11) at zero.

Alternatively, upon all terms with odd-numbered powers of Y being nullified, the free curved surface can define only one plane of symmetry that is parallel to X-Z plane. Such a free curved surface is obtained, for example, by setting values of the coefficients $C_3$, $C_5$, $C_8$, $C_{10}$, $C_{12}$, $C_{14}$, $C_{17}$, $C_{19}$, $C_{21}$, $C_{23}$, $C_{25}$, $C_{27}$, $C_{30}$, $C_{32}$, $C_{34}$, $C_{36}$ ... of the terms in Equation (11) at zero.

Also, a free curved surface that defines one of the above-mentioned planes of symmetry is arranged so that its plane of symmetry corresponds to the decentering direction of the optical system. That is, a free curved surface defining a plane of symmetry parallel to Y-Z plane is combined with an optical system having decentering direction along Y axis, and a free curved surface defining a plane of symmetry parallel to X-Z plane is combined with an optical system having decentering direction along X axis, to effectively compensate rotationally asymmetric aberrations caused by decentering and to improve facility for fabrication.

Equation (11) is presented as one example that can define a free curved surface. Even if the free curved surface having only one plane of symmetry according to the present invention is defined by any different expression, it is still effective in compensation of rotationally asymmetric aberrations caused by decentering and in improvement of facility for fabrication, as a matter of course.

For instance, the free curved surface can be defined by Zernike polynomial, also. The configuration of the surface is defined by the following equations (13). Z axis appearing in Equation (13) represents the axis of Zernike polynomial. The rotationally asymmetric surface is defined by height in Z axis, in terms of polar coordinate, in reference to X—Y plane.

$$X = R \times \cos(A) \quad (13)$$
$$Y = R \times \sin(A)$$
$$Z = D_2 +$$
$$D_3 R\cos(A) + D_4 R\sin(A) +$$
$$D_5 R^2\cos(2A) + D_6(R^2 - 1) + D_7 R^2\sin(2A) +$$
$$D_8 R^3\cos(3A) + D_9(3R^3 - 2R)\cos(A) + D_{10}(3R^3 - 2R)\sin(A) +$$
$$D_{11} R^3\sin(3A) + D_{12} R^4\cos(4A) + D_{13}(4R^4 - 3R^2)\cos(2A) +$$
$$D_{14}(6R^4 - 6R^2 + 1) + D_{15}(4R^4 - 3R^2)\sin(2A) + D_{16} R^4\sin(4A) +$$
$$D_{17} R^5\cos(5A) + D_{18}(5R^5 - 4R^3)\cos(3A) +$$
$$D_{19}(10R^5 - 12R^3 + 3R)\cos(A) +$$
$$D_{20}(10R^5 - 12R^3 + 3R)\sin(A) + D_{21}(5R^5 - 4R^3)\sin(3A) +$$
$$D_{22} R^5\sin(5A) + D_{23} R^6\cos(6A) + D_{24}(6R^6 - 5R^4)\cos(4A) +$$
$$D_{25}(15R^6 - 20R^4 + 6R^2)\cos(2A) +$$
$$D_{26}(20R^6 - 30R^4 + 12R^2 - 1) +$$
$$D_{27}(15R^6 - 20R^4 + 6R^2)\sin(2A) +$$
$$D_{28}(6R^6 - 5R^4)\sin(4A) + D_{29} R^6\sin(6A) ...$$

where R is a distance from Z axis in X—Y plane, A is an azimuth about Z axis expressed by a rotation angle from Z axis, and $D_m$ (m is integer equal to or greater than 2) is a coefficient. It is noted that Equation (13) corresponds to a free curved surface that is symmetric in X direction.

Configuration of an anamorphic surface is defined by the following equation (14). The normal to the optical surface at the origin of the surface shape is defined as the axis of the anamorphic surface.

$$Z=(C_x \cdot X^2+C_y \cdot Y^2)/[1+\{1-(1+K_x)C_x^2 \cdot X^2-(1+K_y)C_y^2 \cdot Y^2\}^{1/2}]+\Sigma R_n\{(1-P_n)X^2+(1+P_n)Y^2\}^{(n+1)} \quad (14)$$

Here, if it is assumed that n is from 1 to 4 (polynomial of degree 4), for example, Equation (14) is expanded as the following expression (15):

$$Z = (C_x \cdot X^2 + C_y \cdot Y^2)/[1+\{1-(1+K_x)C_x^2 \cdot X^2 - \quad (15)$$
$$(1+K_y)C_y^2 \cdot Y^2\}^{1/2}]+$$
$$R_1\{(1-P_1)X^2+(1+P_1)Y^2\}^2 +$$
$$R_2\{(1-P_2)X^2+(1+P_2)Y^2\}^3 +$$
$$R_3\{(1-P_3)X^2+(1+P_3)Y^2\}^4 +$$
$$R_4\{(1-P_4)X^2+(1+P_4)Y^2\}^5$$

where Z is an amount of deviation from a plane tangent to the origin of the surface shape, $C_x$ is a curvature in X-axis direction, $C_y$ is a curvature in Y-axis direction, $K_x$ is a conical coefficient in X-axis direction, $K_y$ is a conical coefficient in Y-axis direction, $R_n$ is a rotationally symmetric component of a spherical surface term, and $P_n$ is a rotationally asymmetric component of an aspherical surface term. A radius of curvature $R_x$ in X-axis direction and a radius of curvature $R_y$ in Y-axis direction are correlated with the curvatures $C_x$, and $C_y$, respectively, as follows:

$$R_x=1/C_x, R_y=1/C_y.$$

Regarding the toric surface, there are two kinds; i.e. X toric surface and Y toric surface, which are expressed by the following equations (16), (17), respectively. The normal to the optical surface at the origin of the surface shape is defined as the axis of the toric surface.

X toric surface is defined as follows:

$$F(X)=C \cdot X^2/[1+\{1-(1+K)C_x^2 \cdot X^2\}^{1/2}]$$
$$+AX^4+BX^6+CX^8+DX^{10} \ldots \quad Z=F(X)+(1/2)$$
$$C_y\{Y^2+Z^2-F(X)^2\} \quad (16)$$

Y toric surface is defined as follows:

$$F(Y)=C \cdot Y^2/[1+\{1-(1+K)C_y^2 \cdot Y^2\}^{1/2}]$$
$$+AY^4+BY^6+CY^8+DY^{10} \ldots \quad Z=F(Y)+(1/2)$$
$$C_x\{X^2+Z^2-F(Y)^2\} \quad (17)$$

where Z is an amount of deviation from a plane tangent to the origin of the surface shape, $C_x$ is a curvature in X-axis direction, $C_y$ is a curvature in Y-axis direction, K is a conical coefficient, and A, B, C, and D are aspherical coefficients. A radius of curvature $R_x$ in X-axis direction and a radius of curvature $R_y$ in Y-axis direction are correlated with the curvatures $C_x$, and $C_y$, respectively, as follows:

$$R_x=1/C_x, R_y=1/C_y.$$

Configuration of a rotationally symmetric aspherical surface is defined by the following equation (18). Z axis appearing in Equation (18) represents the axis of the rotationally symmetric aspherical surface.

$$Z=(Y^2/R)/[1+\{1-P(Y^2/R^2)\}^{1/2}]+A_4Y^4+A_6Y^6+A_8Y^8+A_{10}Y^{10} \quad (18)$$

where Y is a direction perpendicular to Z, R is a radius of paraxial curvature, P is a conical coefficient, and $A_4$, $A_6$, $A_8$, $A_{10}$ are aspherical coefficients.

Figure 31:
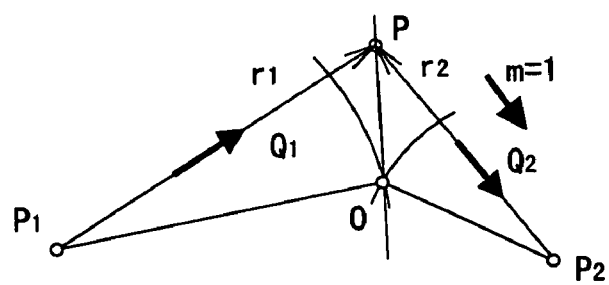
FIG. 31 is a view to show the principle of defining a diffraction element (HOE) according to the present invention.

The diffraction element (HOE) used in the present invention is defined as follows. FIG. 31 is a view to show the principle of defining HOE according to the present invention.

Ray tracing for a ray with wavelength λ incident at and emergent from any point P on the HOE surface is given by the following equation (19), which uses the optical path difference function $\Phi_0$ defined for a reference wavelength $\lambda_0$=HWL on the HOE surface:

$$n_d Q_d \cdot N = n_i Q_i \cdot N + m(\lambda/\lambda_0) \nabla \Phi_0 \cdot N \quad (19)$$

where N is a vector of the normal to the HOE surface, $n_i$ ($n_d$) is a refractive index on the incident side (emergent side), $Q_i$ ($Q_d$) is a vector (unit vector) of incidence (emergence), and m=HOR is a diffraction order of emergent light.

If the HOE is fabricated (defined) by two point light sources with the reference wavelength $\lambda_0$, specifically by interference between object rays emanating from the point $P_1$=(HY1, HY2, HY3) and reference rays emanating from the point $P_2$=(HX2, HY2, HZ2) as shown in FIG. 31, the following equation is satisfied:

$$\Phi_0 = \Phi_0^{2P}$$
$$= n_2 \cdot s_2 \cdot r_2 - n_1 \cdot s_1 \cdot r_1$$

where $r_1$ ($r_2$) is a distance (>0) from the point $P_1$ ($P_2$) to a predetermined coordinate point on the HOE, $n_1$ ($n_2$) is a refractive index of the point $P_1$ ($P_2$)-side medium by which the HOE was arranged during fabrication (definition), $s_1$=HV1, and $s_2$=HV2 are signs to take into consideration the travelling direction of light. In the case where the light source is a divergent light source (real point light source), the sign is set to be REA=+1, while in the case where the light source is a convergent light source (virtual point light source), the sign is set to be VIR=−1. It is noted that in defining a HOE in lens data, the refractive index $n_1$ ($n_2$) of the medium in which the HOE was arranged during fabrication is the refractive index of the medium that is adjacent to the HOE on the side of the point $P_1$ ($P_2$).

In general cases, reference rays and object rays used to fabricate a HOE are not limited to spherical waves. In these cases, the optical path difference function $\Phi_0$ of HOE can be defined by the following equation (20) in which an additional phase term $\Phi_0^{Poly}$ (optical path difference function for the reference wavelength $\lambda_0$) expressed by polynomial terms is added:

$$\Phi_0 = \Phi_0^{2P} + \Phi_0^{Poly} \quad (20)$$

The polynomial $\Phi_0^{Poly}$ is given by:

$$\Phi_0^{Poly} = \sum_j H_j \cdot x^m \cdot y^n$$
$$= H_1 x + H_2 y + H_3 x^2 + H_4 xy + H_5 y^2 +$$
$$H_6 x^3 + H_7 x^2 y + H_8 xy^2 + H_9 y^3 + \cdots$$

and can be defined, in general, by:

$$j = \{(m+n)^2 + m + 3n\}/2$$

where $H_j$ is the coefficient of each term.

Furthermore, for convenience in optical designing, the optical path difference function $\Phi_0$ may be expressed only by the additional term as follows:

$$\Phi_0 = \Phi_0^{Poly}$$

whereby the HOE can be defined. For example, if the two point light sources $P_1$ and $P_2$ coincide, the component $\Phi_0^{2P}$ of the optical path difference function $\Phi_0$ derived from interference becomes zero. This condition corresponds to the case where the optical path difference function is expressed only by the additional terms (polynomial expression).

The above descriptions regarding HOE are made in reference to a local coordinate system determined by the HOE origin (O in FIG. 31).

An example of the parameter set to define the HOE is shown below:

| Surface Arrangement No. | Radius of Curvature | Separation |
| --- | --- | --- |
| object surface | ∞ | ∞ |
| stop | ∞ | 100 |
| 2 | 150 | −75 |

HOE:

$HV1$ ($s_1$)=REA (+1)

$HV2$ ($s_2$)=VIR (−1)

$HOR$ ($m$)=1

$HX1$=0, $HY1$=−3.40×10⁹, $HZ1$=−3.40×10⁹

$HX2$=0, $HY2$=2.50×10, $HZ2$=−7.04×10

$HWL$ ($\lambda_0$)=544

$H_1$=−1.39×10⁻²¹ $H_2$=−8.57×10⁻⁵ $H_3$=−1.50×10⁻⁴

In reference to the drawings, the individual embodiments are described below.

Figure 2:
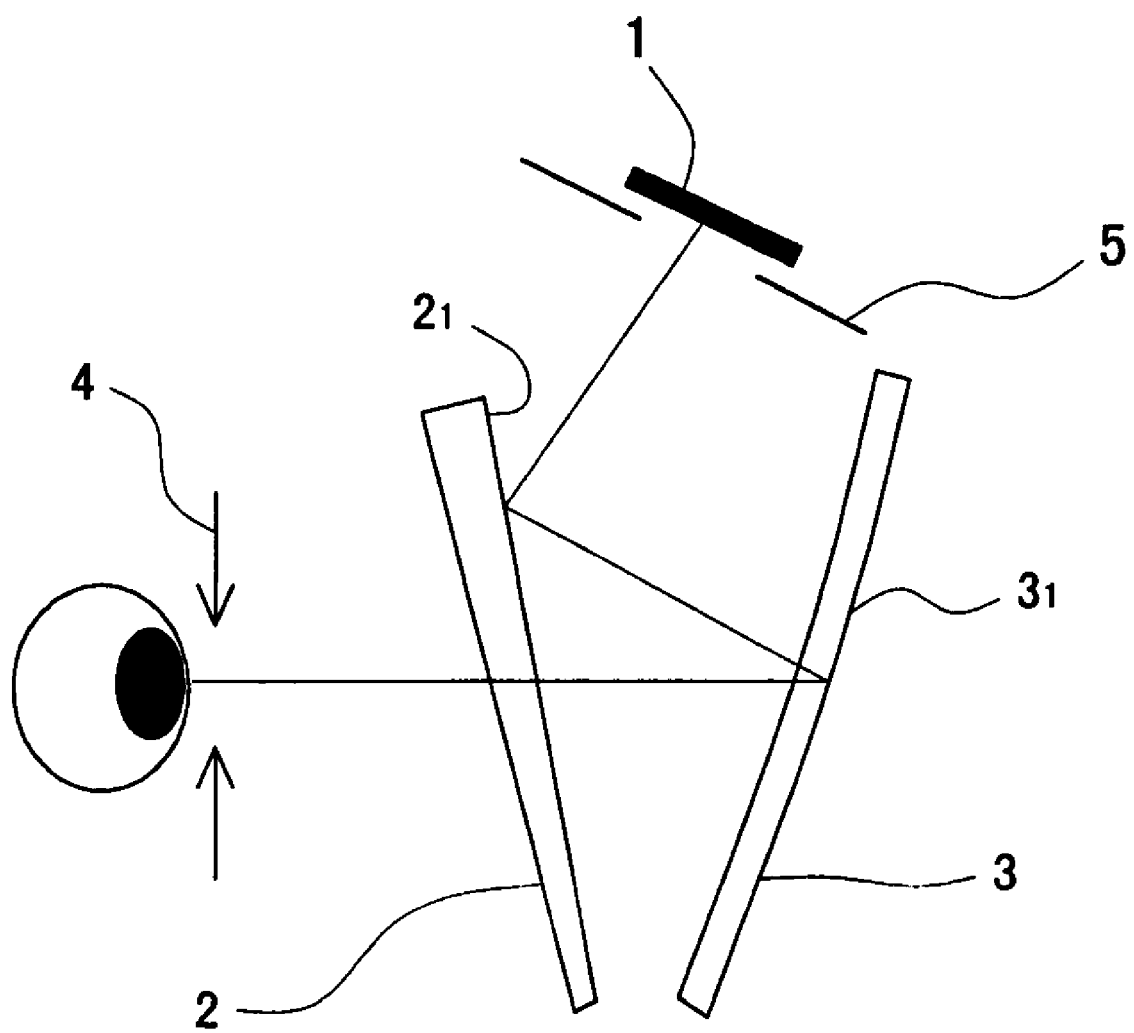
FIG. 2 is a sectional view of an essential portion of the image display apparatus according to the first embodiment of the present invention.

In each embodiment, as shown in FIG. 2, the axial chief ray is defined as a ray travelling from the center of an exit pupil 4 (the rotation center of an eyeball of an observer) to the center of an image display element 1 such as a LCD via a first optical member 2 and a second optical member 3. The optical axis, which is defined by the straight line portion of the axial chief ray until it intersects the entrance surface of the first optical member 2, is defined as Z axis. The axis that intersects Z axis at right angles and that is parallel with a plane of the figure sheet is defined as Y axis. The axis that intersects the optical axis and Y axis at right angles is defined as X axis. The center of the exit pupil 4 is determined as the origin of this coordinate system. The direction of the axial chief ray from the exit pupil 4 toward the image display element 1 is defined as a positive direction of Y axis. A direction of Y axis that is toward the image display element 1 is defined as a positive direction of Y axis. A direction of X axis that forms a right-hand system along with Y axis and Z axis is defined as a positive direction of X axis.

In the case where a prism is applied to an embodiment of the present invention, the prism is decentered in Y-Z plane. Also, each rotationally asymmetric free curved surface provided for the prism has the only one plane of symmetry on Y-Z plane.

For each decentered surface, amount of displacement (expressed by X, Y, Z for components in X-axis direction, Y-axis direction, Z-axis direction, respectively) of the vertex position of the surface from the origin of the corresponding coordinate system and tilt angles ($\alpha$, $\beta$, $\gamma$ (°)) of the center axis (=Z axis in Equation (11) for a free curved surface) of the surface in reference to X axis, Y axis and Z axis, respectively, are given. A positive value of α or β means counterclockwise rotation in reference to the positive direction of the corresponding axis, while a positive value of γ means clockwise rotation in reference to the positive direction of Z axis. Other parameters such as radius of curvature of spherical surface, surface separation, refractive index of medium, and Abbe's number are given by the conventional method.

Shape of the free curve surface used in the present invention is defined by Equation (11), where Z axis corresponds to the axis of the free curved surface. However, even if Equation (13) is applied, it does not affect the function and effect of the invention, as a matter of course.

First Embodiment

In reference to FIG. 2, an image display apparatus according to the first embodiment of the present invention is described. In FIG. 2, the reference numeral 1 represents an image display element such as a LCD, the reference numeral 2 represents a thin platelike first optical member, the reference numeral $2_1$ represents a reflecting surface of the first optical member 2, the reference numeral 3 represents a thin platelike second optical member, the reference numeral $3_1$ represents a reflecting surface of the second optical member 3, the reference numeral 4 represents an exit pupil, and the reference numeral 5 represents a flare stop disposed in front of the image display element 1.

According to this embodiment, a non-coaxial (decentered) observation optical system having a positive refracting power is composed optical members 2 and 3. In the observation optical system, bundles of rays emergent from the image display element 1 are reflected at the reflecting surface $2_1$ of the optical member 2, to be directed toward the optical member 3, and the bundles of rays reflected at the reflecting surface $3_1$ of the optical member 3 are re-directed toward the optical member 2, to be transmitted therethrough.

The reflecting surface $3_1$ of the optical member 3 is shaped as a curved surface which exerts a power on bundles of rays. The curved surface is a rotationally asymmetric surface constructed and arranged to compensate aberrations generated by decentering. Whereby, aberrations are compensated in good condition while compact-sizing of the apparatus is achieved.

Also, the first optical member 2 is configured as a Lippmann volume hologram, and the second optical member 3 is configured as a free curved surface lens.

A space between the first optical member 2 and the second optical member is not filled with glass or plastic, but with gas, to thereby achieve weight reduction of the observation optical system.

According to this embodiment, a diffraction element and a free curved surface (free curved surface lens) are used as the reflecting surfaces of the observation optical system. However, not limited to these, an aspherical surface, a toric surface, a polarizing plate or the like may be used as a reflecting surface.

Also, according to this embodiment, the pixel pitch P of the image display element 1 is 12 μm, the distance ZD is 15 mm, and the pupil diameter PD is 4.5 mm.

Second Embodiment

Figure 3:
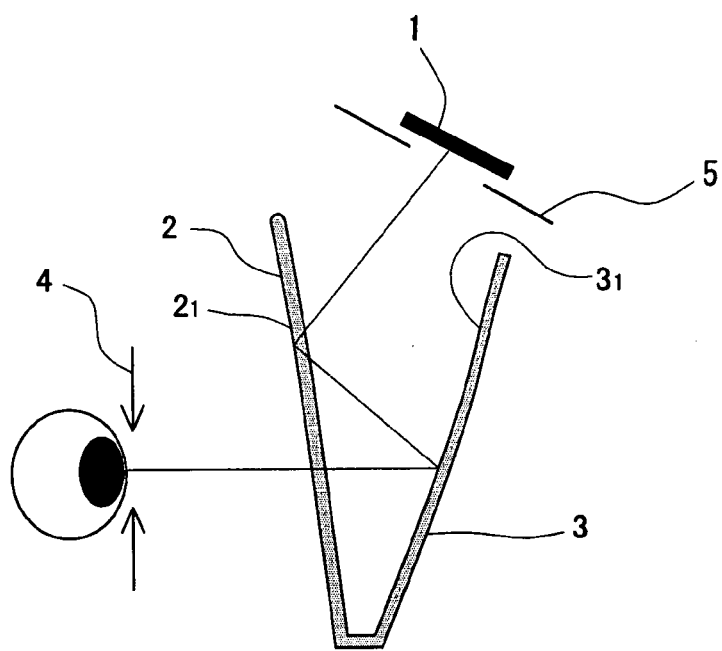
FIG. 3 is a sectional view of an essential portion of the image display apparatus according to the second embodiment of the present invention.

In reference to FIG. 3, an image display apparatus according to the second embodiment of the present invention is described.

According to this embodiment, a non-coaxial (decentered) observation optical system having a positive refracting power is composed of optical members 2 and 3. In the observation optical system, bundles of rays emergent from the image display element 1 are reflected at the reflecting surface $2_1$ of the optical member 2, to be directed toward the optical member 3, and the bundles of rays reflected at the reflecting surface $3_1$ of the optical member 3 are re-directed toward the optical member 2, to be transmitted therethrough.

The reflecting surface $3_1$ of the optical member 3 is shaped as a curved surface which exerts a power on bundles of rays. The curved surface is a rotationally asymmetric surface constructed and arranged to compensate aberrations generated by decentering. Whereby, aberrations are compensated in good condition while compact-sizing of the apparatus is achieved. Also, this embodiment is different from the embodiment of FIG. 2 in that the optical member 2 and the optical member 3 are integrally formed. However, the optical member 2 and the optical member 3 maybe formed separately.

Also, according to this embodiment, the first optical member 2 is configured as a Lippmann volume hologram, and the second optical member 3 is configured as a free curved surface lens.

A space between the first optical member 2 and the second optical member 3 is not filled with glass or plastic, but with gas, to thereby achieve weight reduction. The mouth of the space may be closed up with a transparent optical member for the purpose of preventing dust to be entrapped in the space filled with gas.

According to this embodiment also, a diffraction element and a free curved surface (free curved surface lens) are used as the reflecting surfaces of the observation optical system, as in the embodiment of FIG. 2. However, not limited to these, an aspherical surface, a toric surface, a polarizing plate or the like may be used as a reflecting surface.

Also, according to this embodiment, the pixel pitch P of the image display element 1 is 10 μm, the distance ZD is 20 mm, and the pupil diameter PD is 4.5 mm.

Third Embodiment

Figure 4:
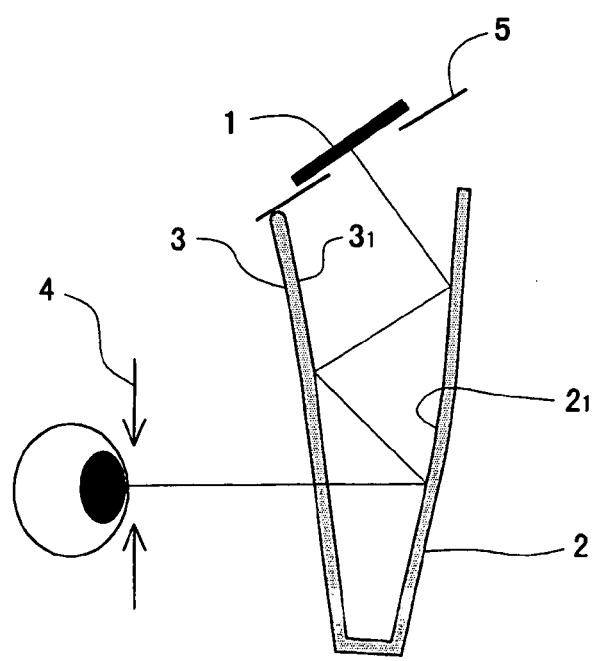
FIG. 4 is a sectional view of an essential portion of the image display apparatus according to the third embodiment of the present invention.

In reference to FIG. 4, an image display apparatus according to the third embodiment of the present invention is described.

According to this embodiment, a non-coaxial (decentered) observation optical system having a positive refracting power is composed of optical members 2 and 3. In the observation optical system, bundles of rays emergent from the image display element 1 are reflected at the reflecting surface $2_1$ of the optical member 2, to be directed toward the optical member 3, are reflected at the reflecting surface $3_1$ of the optical member 3, to be re-directed toward the optical member 2, and are reflected at the reflecting surface $2_1$ of the optical member 2, to be re-directed toward the optical member 3, and then are transmitted through the optical member 3.

The optical member 2 is shaped as a curved surface which exerts a power on bundles of rays. The curved surface is a rotationally asymmetric surface constructed and arranged to compensate aberrations generated by decentering. Whereby, aberrations are compensated in good condition while compact-sizing of the apparatus is achieved.

Also, the optical member 2 and the optical member 3 are integrally formed. However, the optical member 2 and the optical member 3 may be formed separately.

Also, the first optical member 2 is configured as a Lippmann volume hologram, and the second optical member 3 is configured as a free curved surface lens.

A space between the first optical member 2 and the second optical member 3 is not filled with glass or plastic, but with gas, to thereby achieve weight reduction. The mouth of the space may be closed up with a transparent optical member for the purpose of preventing dust to be entrapped in the space filled with gas.

According to this embodiment also, a diffraction element and a free curved surface (free curved surface lens) are used as the reflecting surfaces of the observation optical system, as in the embodiment of FIG. 2. However, not limited to these, an aspherical surface, a toric surface, a polarizing plate or the like may be used as a reflecting surface.

Also, according to this embodiment, the pixel pitch P of the image display element 1 is 8 μm, the distance ZD is 10 mm, and the pupil diameter PD is 3.5 mm.

Fourth Embodiment

Figure 5A:
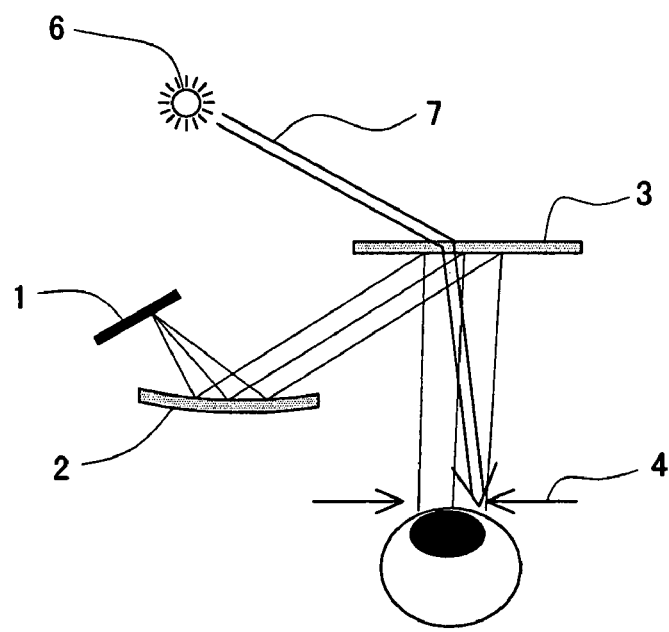
FIG. 5A is a sectional view of an essential portion of the image display apparatus of the reference example.
Figure 5B:
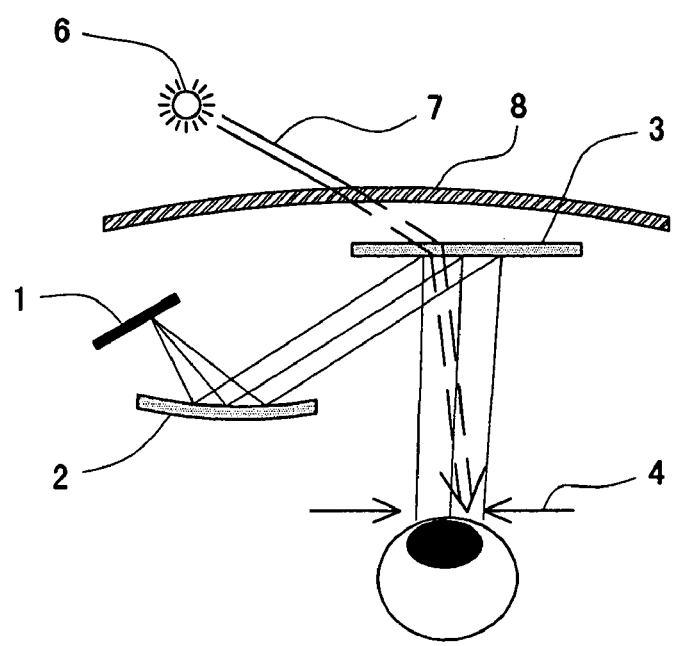
FIG. 5B is a sectional view of an essential portion of the image display apparatus according to the fourth embodiment of the present invention.

In reference to FIGS. 5A–5B, an example in which flare by undesired order rays associated with use of a HOE is reduced is presented as the fourth embodiment. According to the reference example shown in FIG. 5A, a volume hologram (HOE) is used for a thin platelike second optical member 3, to generate flare as a bundle 7 of rays from an emitting point 6 such as the sun or an electric lamp is diffracted at the HOE 3. On the other hand, according to the present invention shown in FIG. 5B, the bundle 7 of rays from the emitting point 6 is interrupted to a practically harmless level, to suppress generation of flare. Specifically, arranging an optical member 8 so that the diffraction element 3 is positioned between the exit pupil 4 and the optical member 8 prevents flare from being generated.

Fifth Embodiment

Figure 6:
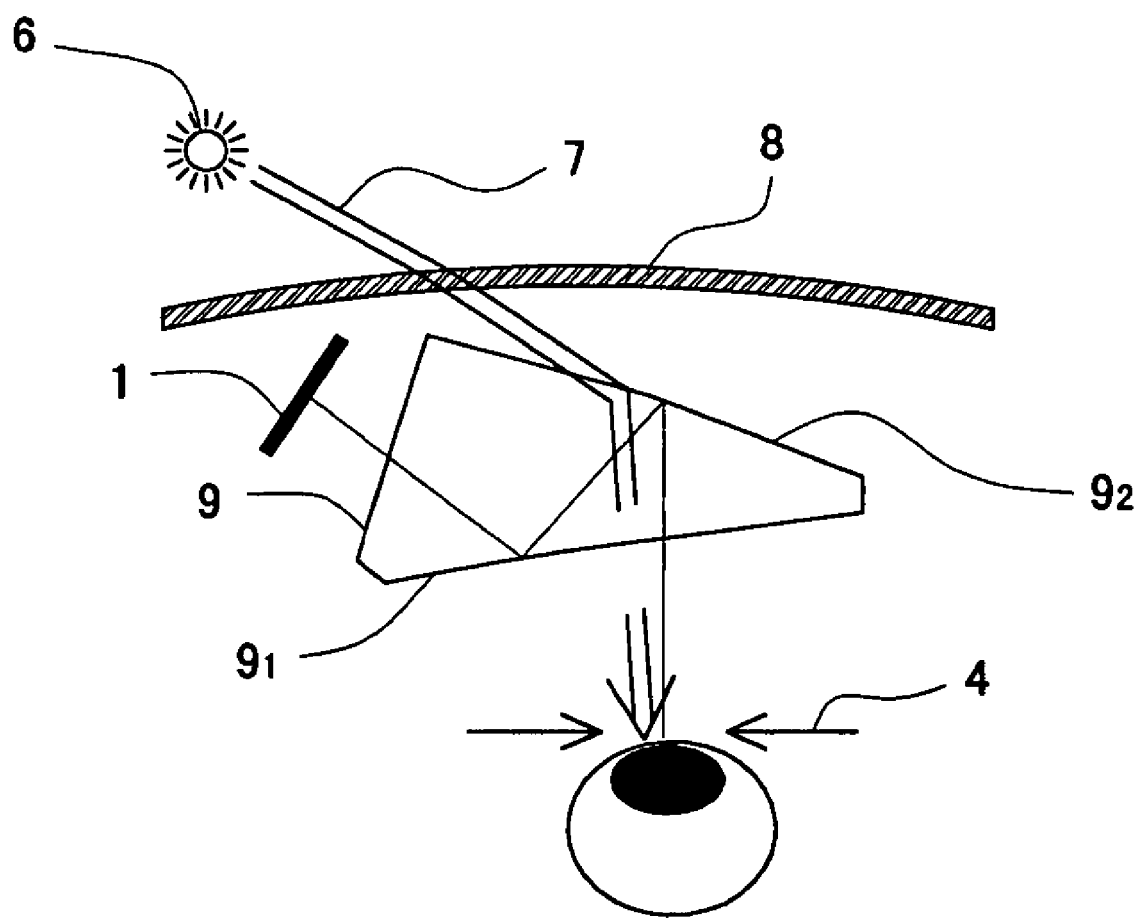
FIG. 6 is a sectional view of an essential portion of the image display apparatus according to the fifth embodiment of the present invention.

In reference to FIG. 6, an image display apparatus according to the fifth embodiment of the present invention is described. The fifth embodiment is a modified example of the fourth embodiment. The image display apparatus according to this embodiment is provided with a prism member 9 in place of the first optical member 2 and the second optical member 3 of the fourth embodiment. The prism member 9 has a first reflecting surface $9_1$ and a second reflecting surface $9_2$. The second reflecting surface $9_2$ of the prism member 9 is composed of a volume hologram (HOE). The optical member 8 satisfying Condition (2) suppresses generation of flare, which should have been caused by the bundle 7 of rays from the emitting point 6 diffracted by the HOE and introduced into the eye, by interrupting the bundle 7 of rays from the emitting point 6 to a practically harmless level. Specifically, arranging the optical member 8 so that the diffraction element 3 is positioned between the exit pupil 4 and the optical member 8 prevents flare from being generated.

Sixth Embodiment

Figure 7A:
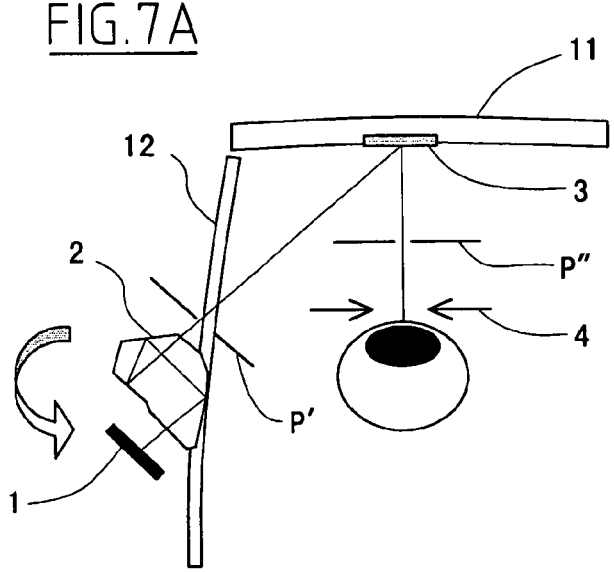
FIGS. 7A–7C show the image display apparatus according to the sixth embodiment of the present invention, where
Figure 7B:
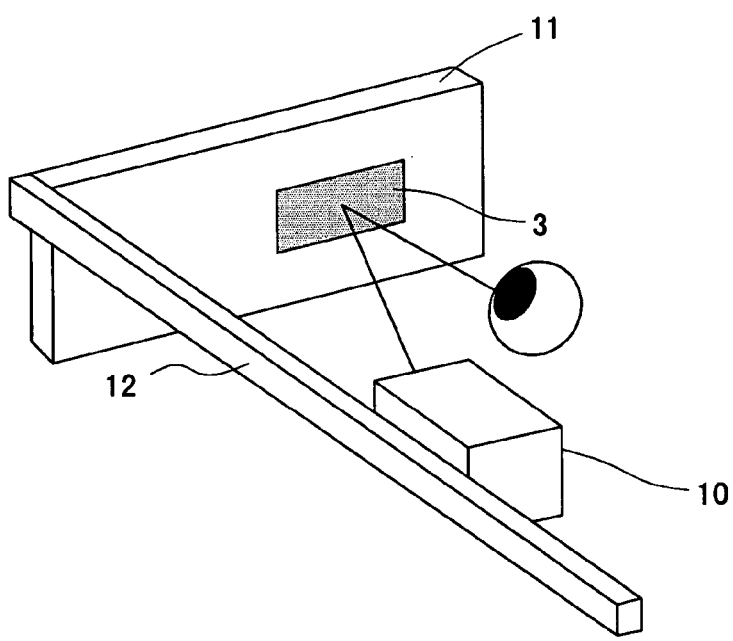
Figure 7C:
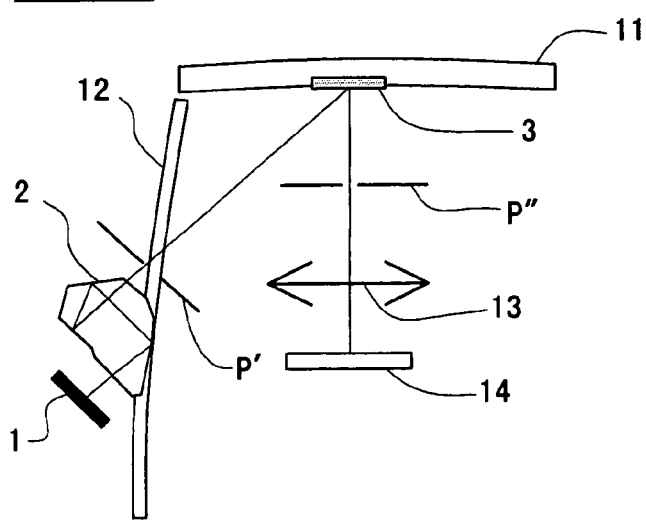

In reference to FIGS. 7A–7C, an image display apparatus according to the sixth embodiment of the present invention is described. In the drawings, the reference numeral 1 represents an image display element such as a LCD, the reference numeral 2 represents a first unit of the observation optical system composed of a single prism member having a positive refracting power, the reference numeral 3 represents a second unit of the observation optical system composed of a volume hologram (HOE) having a positive refracting power, and the reference numeral 4 represents an exit pupil. Also, the reference symbols P', P" are first and second pinholes, respectively, used in optical axis alignment. The reference numeral 10 represents a frame member which holds the first unit of the observation optical system, the reference numeral 11 is a frame member which holds the second unit of the observation optical system. The frame member 10 and the frame member 11 are supported by a frame member 12 having an oblong shape. The frame member 10 is constructed and arranged to be movable in reference to the frame member 12 so that optical axis alignment of the first unit and the second unit can be performed by moving the frame member 10.

In alignment process of the optical axes of the image display element 1, the first unit and the second unit, the pinhole P' is arranged on the exit surface side of the first unit and is aligned with the optical axis of the first unit, the pinhole P" is arranged on the exit surface side of the second unit and is aligned with the optical axis of the second unit, and a central portion of the image display element 1 is made to flash as a point light source. Then, optical axis alignment can be achieved by adjusting the first unit so that the point light source is observable through the first pinhole and the second pinhole.

After optical axis alignment, it is desirable to fix the frame member 10 with adhesive.

Also, according to this embodiment, we can perform the optical axis alignment while monitoring an image on a LCD upon arranging a photographing optical system including an image sensor 14 on the exit pupil side.

Seventh Embodiment

Figure 8:
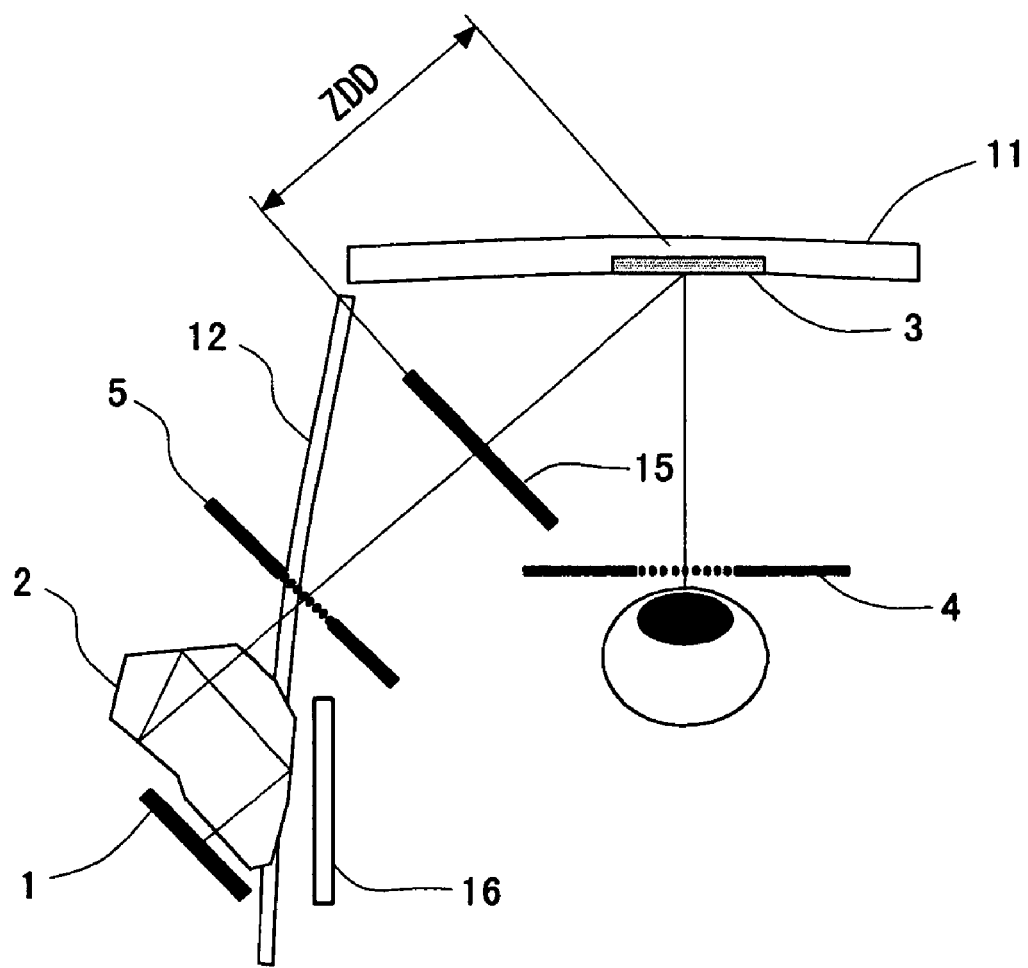
FIG. 8 is a sectional view of an essential portion of the image display apparatus according to the seventh embodiment of the present invention.

In reference to FIG. 8, an image display apparatus according to the seventh embodiment of the present invention is described. According to this embodiment, a flare stop 5 is disposed between a first unit 2 composed of a prism member having a positive refracting power and a second unit 3 composed of a prism member having a positive refracting power so as to prevent flare. Also, in the observation optical system of this embodiment, compact-sizing of the apparatus can be achieved by the arrangement where an image is once formed at the position indicated by the reference numeral 15. The symbol ZDD shown in the drawing represents a distance from the primary image surface to the second unit, which satisfies Condition (3), to prevent flare or the like caused by dust. Also, a member 16 having a function of interrupting stray light from the image display element 1 is disposed between the image display element 1 and the exit pupil 4. A frame member 12 holds the first unit 2, and a frame member 11 holds the second unit 3.

The prism member 2 constituting the first unit has an entrance surface via which bundles of rays emergent from the image display element 1 enter the prism member, at least one reflecting surface which reflect the bundles of rays inside the prism member, and an exit surface via which the bundles of rays exit out of the prism member. The at least one reflecting surface has a curved surface shape to exert a power on bundles of rays. The curved surface shape is configured as a rotationally asymmetric surface shape to compensate aberrations generated by decentering.

Eighth Embodiment

Figure 9:
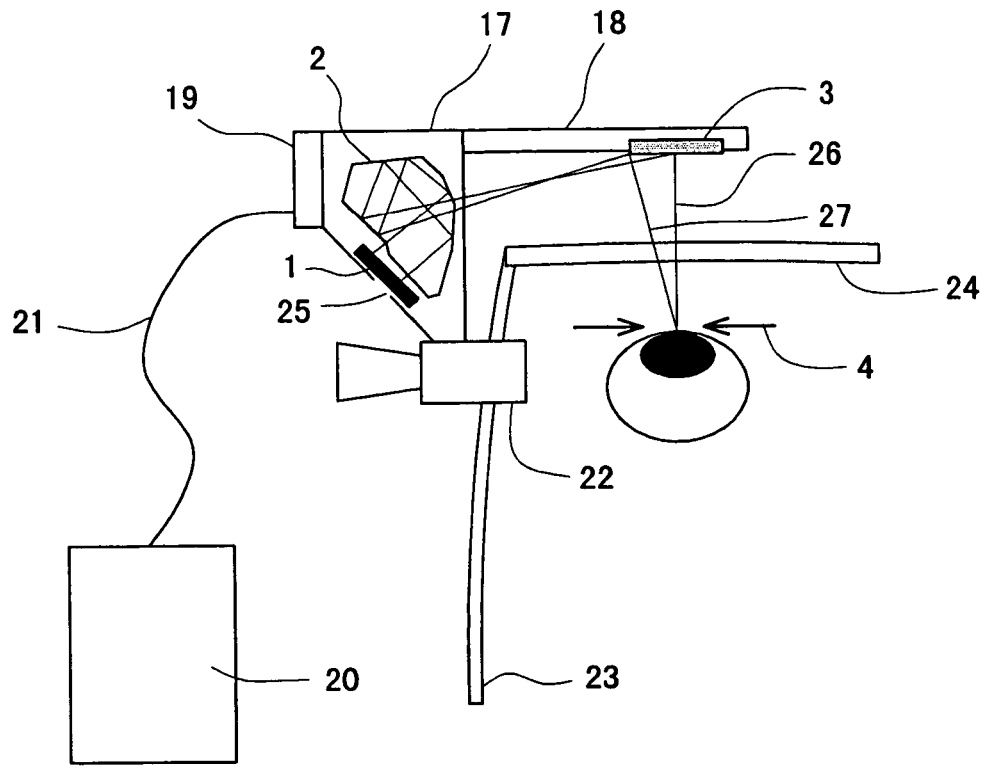
FIG. 9 is a sectional view of an essential portion of the image display apparatus according to the eighth embodiment of the present invention.

In reference to FIG. 9, an example that achieves a compact image display apparatus is presented as the eighth embodiment. According to this embodiment, a first unit 2 having a positive refracting power and a second unit 3 constitutes a non-coaxial (decentered) observation optical system having a positive refracting power. The first unit 2 is composed of a prism member, which has an entrance surface via which bundles of rays emergent from the image display element enter the prism member, at least one reflecting surface which reflect the bundles of rays inside the prism member, and an exit surface via which the bundles of rays exit out of the prism member. The at least one reflecting surface has a curved surface shape to exert a power on bundles of rays. The curved surface shape is configured as a rotationally asymmetric surface shape to compensate aberrations generated by decentering. The first unit 2 is configured so that reflection takes place three times inside the prism member for the purpose of achieving compact-sizing. The second unit 3 is composed of a HOE and has an action of canceling chromatic aberration generated in the first unit 2.

Also, a first frame 17 holds the first unit 2 and a second frame 18 holds the second unit 3. The first frame 17 and the second frame 18 are connected at a part thereof to form an integral member. Also, the HOE 3 is arranged to be substantially perpendicular to a ray along the optical axis emergent from the HOE to enter the pupil. Therefore, it is possible to construct the second frame 18 to be thin.

Also, in FIG. 9, the reference numeral 19 represents a control section for outputting video to the image display element, the reference numeral 20 represents a recording section of the image to be output to the image display element, the reference numeral 21 represents wiring which transmits data from the recording section 20 to the control section 19. It is noted that data communication may be performed wirelessly without using the wiring 21.

Also, in FIG. 9, the reference numeral 22 represents a clip used to attach the image display apparatus of the present invention to spectacles or sunglasses, the reference numeral 23 represents a frame of spectacles, and the reference numeral 24 represents a lens section of the spectacles. The clip 22 connects with the first frame 17 so that clipping the frame 23 of spectacles with the clip 22 allows the spectacles to support the first frame member 17.

Also, in FIG. 9, the reference numeral 25 represents a window to take in external light for the purpose of illuminating the image display element such as a LCD. If the external light is weak, an illuminating means (not shown) built in the frame 17 is used. On the other hand, if the apparatus is used in a site where external light is intense such as outdoors, illumination of the image display element such as a LCD can be performed with external light via the window 25 without using the illuminating means. The window 25 may be constructed of a lens or a HOE element for the purpose of taking in the external light efficiently.

Also, in FIG. 9, the reference numeral 26 represents an axial chief ray travelling along the image center, and the reference numeral 27 represents an off-axial chief ray. According to this embodiment, satisfaction of Condition (4) achieves high image quality of the observation optical system, while satisfaction of Condition (5) achieves compact-sizing of the observation optical system.

Also, the recording section 20 may be configured as a cellular phone or a portable intelligence terminal. Electric power for driving the LCD or for illumination may be supplied from the recording section 20.

Ninth Embodiment

Figure 10:
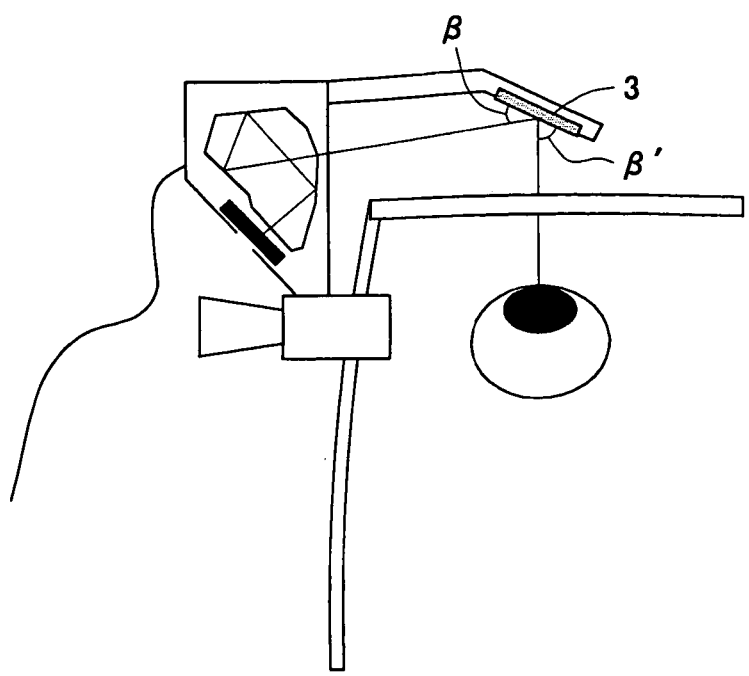
FIG. 10 is a sectional view of an essential portion of the image display apparatus according to the ninth embodiment of the present invention.

In reference to FIG. 10, an image display apparatus according to the ninth embodiment of the present invention is described. The ninth embodiment is a modification example of the eighth embodiment. The ninth embodiment differs from the eighth embodiment in the configuration of the observation optical system. Specifically, the HOE 3 is arranged not to be substantially perpendicular to a ray along the optical axis emergent from the HOE to enter the pupil. The HOE 3 is directed so that the incident angle β of this axial ray is substantially equal to the emergent angle β' thereof, to weaken the power of the HOE. Therefore, according to this embodiment, this arrangement has an effect of suppressing flare by undesired order rays generated at the HOE.

In particular, according to this embodiment, satisfaction of the following condition (21) makes it possible to suppress generation of flare by undesired order rays and thus to obtain a good imaging performance:

$$0.5 < |\beta/\beta'| < 1.5 \tag{21}$$

In addition, it is much desirable to satisfy the following condition (22), further limiting Condition (21):

$$0.8 < |\beta/\beta'| < 1.2 \tag{22}$$

Tenth Embodiment

Figure 11:
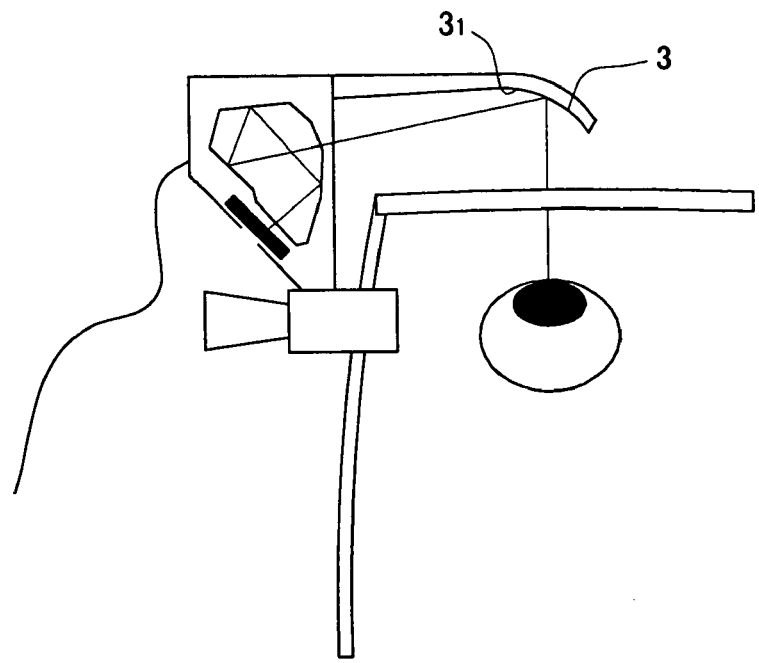
FIG. 11 is a sectional view of an essential portion of the image display apparatus according to the tenth embodiment of the present invention.

In reference to FIG. 11, an image display apparatus according to the tenth embodiment of the present invention is described. The tenth embodiment is another modification example of the eighth embodiment. This embodiment differs from the eighth embodiment in the configuration of the observation optical system. Specifically, it is characterized by use of a reflecting surface $3_1$ having a positive refracting power as the second unit 3. It is given the effect of precluding flare caused by undesired order rays generated at a HOE element by absence of the HOE element, not like the eighth embodiment. Also, configuring the reflecting surface $3_1$ of the second unit 3 as a free curved surface makes it possible to compensate aberrations caused by decentering in good condition.

Eleventh Embodiment

Figure 12:
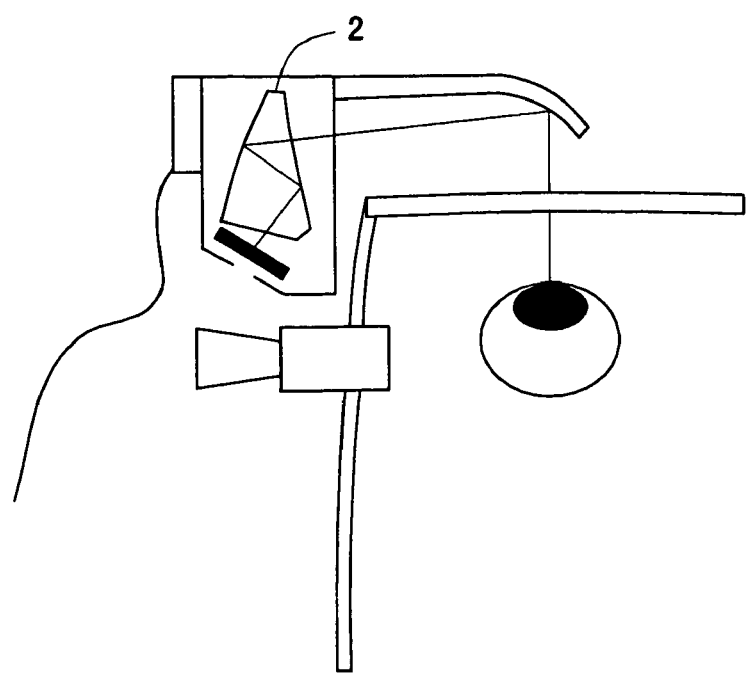
FIG. 12 is a sectional view of an essential portion of the image display apparatus according to the eleventh embodiment of the present invention.

In reference to FIG. 12, an image display apparatus according to the eleventh embodiment of the present invention is described. The eleventh embodiment is a modification example of the tenth embodiment. The eleventh embodiment differs from the tenth embodiment in the configuration of the observation optical system. Specifically, it is characterized by use of a two-reflection type prism optical system in the first unit 2.

Twelfth Embodiment

Figure 13:
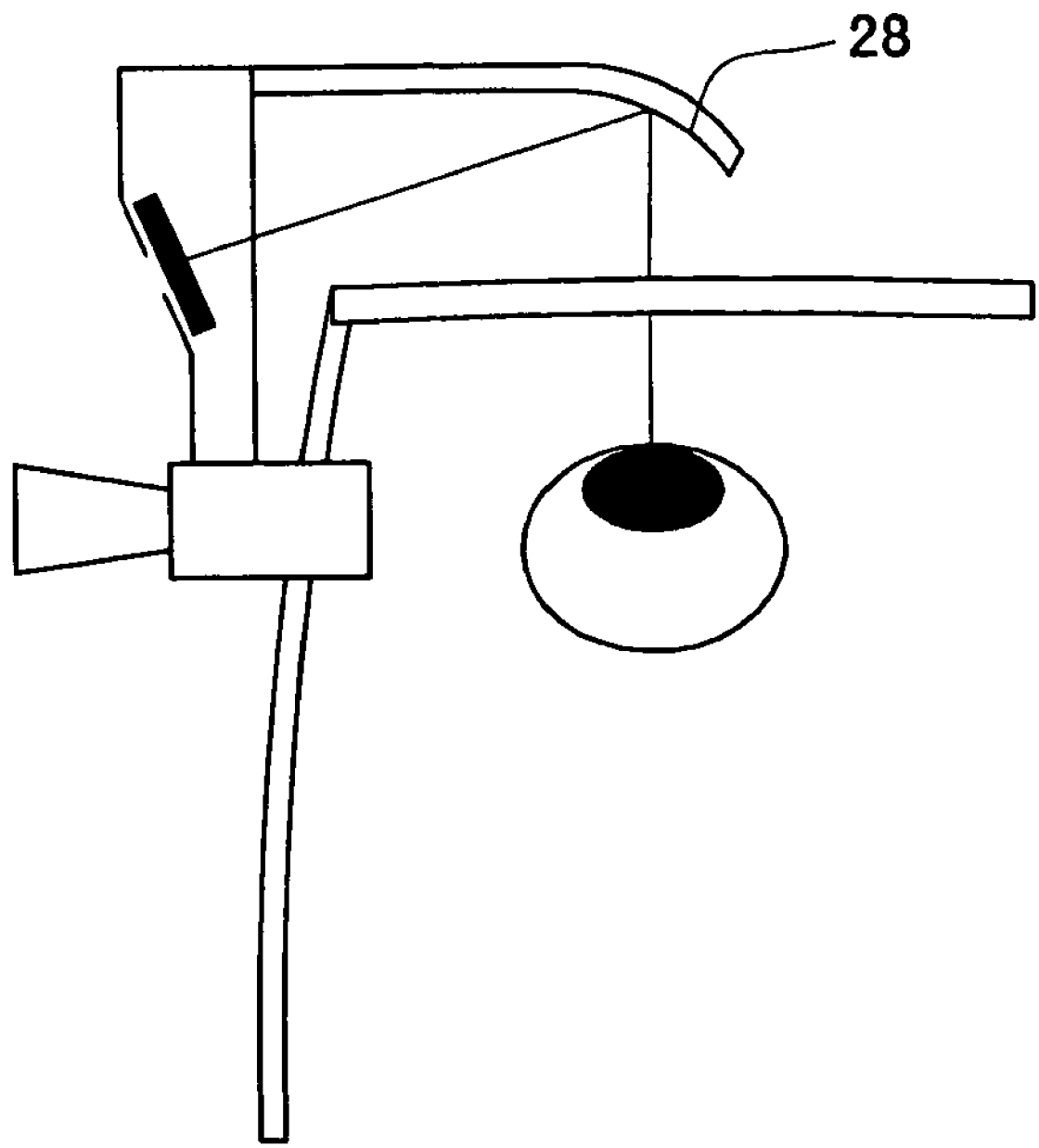
FIG. 13 is a sectional view of an essential portion of the image display apparatus according to the twelfth embodiment of the present invention.

In reference to FIG. 13, an image display apparatus according to the twelfth embodiment of the present invention is described. The twelfth embodiment is another modification example of the tenth embodiment. The twelfth embodiment differs from the tenth embodiment in the configuration of the observation optical system. The observation optical system composed of a reflecting surface 28 alone achieves weight reduction.

Also, the prism used in the observation optical system according to the present invention is not limited to the types of the above-described embodiments. For example, the prism shown in FIGS. 14–24 may be used.

Figure 14:
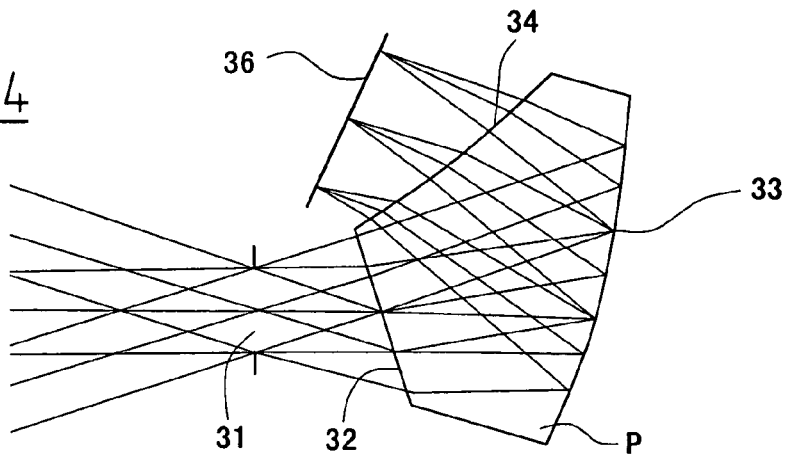
FIG. 14 shows an example of a prism applicable to the prism member of the observation optical system according to the present invention.

In the case of FIG. 14, a prism P is provided with a first surface 32, a second surface 33, and a third surface 34. The first surface 32, the second surface 33, and the third surface 34 are constructed and arranged as an exit surface, a reflecting surface, and an entrance surface, respectively. The prism P is configured so that light from a LCD 36 enters the prism as being refracted at the third surface 34 thereof, is reflected at the second prism 33, exits out of the prism as being refracted at the first surface 32 thereof, and then is imaged on an image surface 31.

Figure 15:
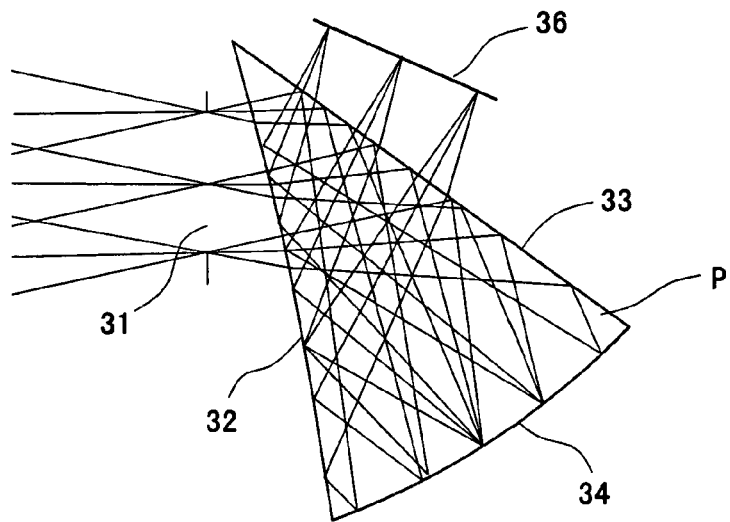
FIG. 15 shows another example of a prism applicable to the prism member of the observation optical system according to the present invention.

In the case of FIG. 15, a prism P is provided with a first surface 32, a second surface 33, and a third surface 34. The first surface 32 is constructed and arranged to act both as a first reflecting surface and an exit surface. The second surface 33 is constructed and arranged to act both as a third reflecting surface and an entrance surface. The third surface 34 is constructed and arranged as a second reflecting surface. The prism P is configured so that light from a LCD 36 enters the prism as being refracted at the second surface 33 thereof, is reflected at the first surface 32, and is reflected at the third surface 34, then is reflected at the second surface 33, exits out of the prism as being refracted at the first surface 32 thereof, and is imaged on an image surface 31.

Figure 16:
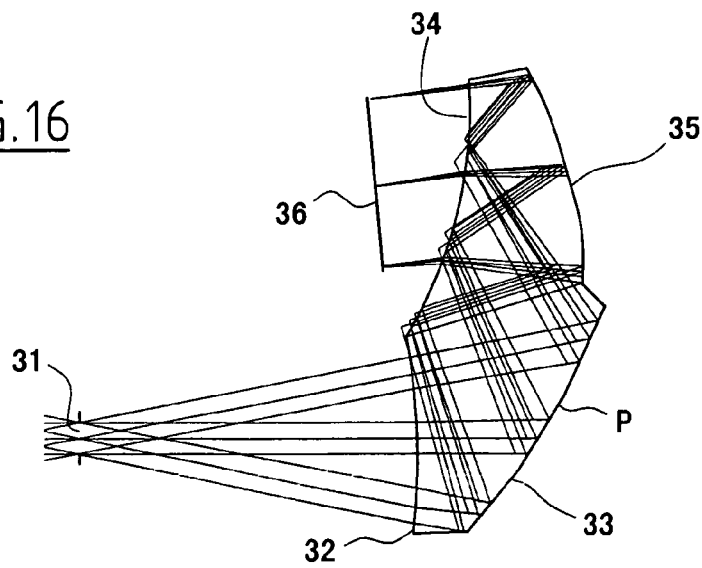
FIG. 16 shows still another example of a prism applicable to the prism member of the observation optical system according to the present invention.

In the case of FIG. 16, a prism P is provided with a first surface 32, a second surface 33, a third surface 34, and a fourth surface 35. The first surface 32 is constructed and arranged as an exit surface. The second surface 33 is constructed and arranged as a third reflecting surface. The third surface 34 is constructed and arranged to act both as an entrance surface and a second reflecting surface. The fourth surface 35 is constructed and arranged as a first reflecting surface. The prism P is configured so that light from a LCD 36 enters the prism as being refracted at the third surface 34 thereof, is reflected at the fourth surface 35, then is reflected at the third surface 34, is reflected at the second surface 33, exits out of the prism as being refracted at the first surface 32 thereof, and is imaged on an image surface 31.

Figure 17:
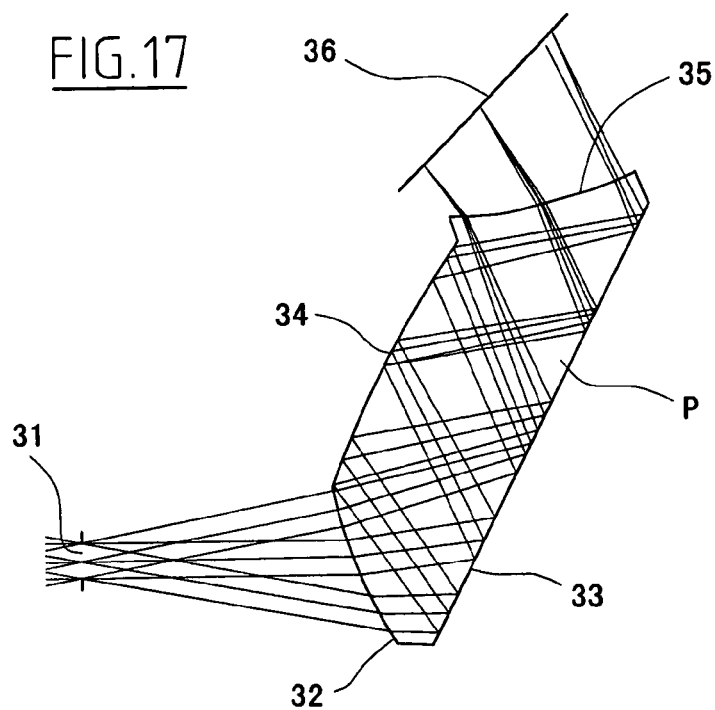
FIG. 17 shows still another example of a prism applicable to the prism member of the observation optical system according to the present invention.

In the case of FIG. 17, a prism P is provided with a first surface 32, a second surface 33, a third surface 34, and a fourth surface 35. The first surface 32 is constructed and arranged as an exit surface. The second surface 33 is constructed and arranged to provide, at different positions on the very same surface, a region acting as a first reflecting surface and a region acting as a third reflecting surface. The third surface 34 is constructed and arranged as a second reflecting surface. The fourth surface 35 is constructed and arranged as an entrance surface. The prism P is configured so that light from a LCD 36 enters the prism as being refracted at the fourth surface 35 thereof, is reflected at the first reflecting surface on the second surface 33, is reflected at the third surface 34, then is reflected at the third reflecting surface on the second surface 33, exits out of the prism as being refracted at the first surface 32 thereof, and is imaged on an image surface 31.

Figure 18:
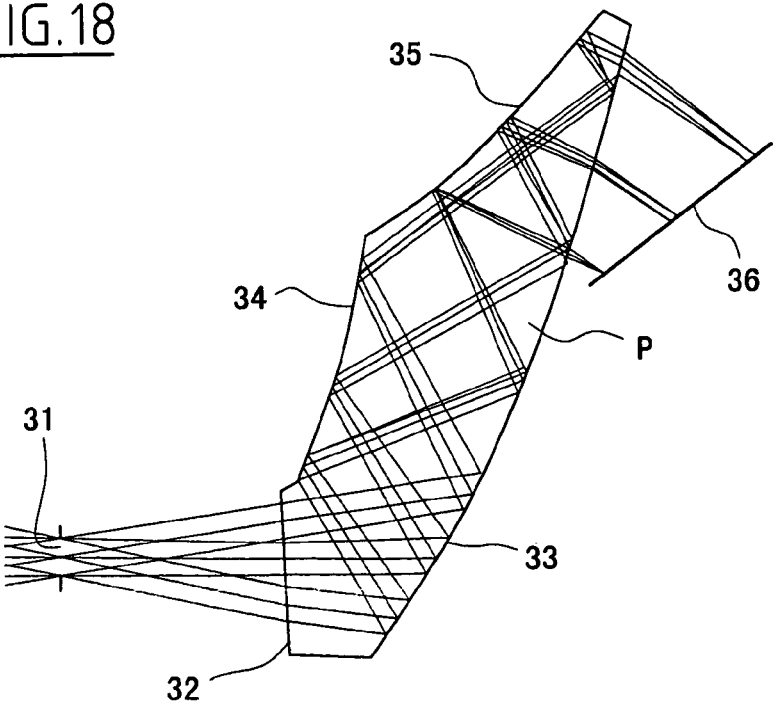
FIG. 18 shows still another example of a prism applicable to the prism member of the observation optical system according to the present invention.

In the case of FIG. 18, a prism P is provided with a first surface 32, a second surface 33, a third surface 34, and a fourth surface 35. The first surface 32 is constructed and arranged as an exit surface. The second surface 33 is constructed and arranged to provide, at different positions on the very same surface, a region that acts both as an entrance surface and a second reflecting surface and a region that acts as a fourth reflecting surface. The third surface 34 is constructed and arranged as a third reflecting surface. The fourth surface 35 is constructed and arranged as a first reflecting surface. The prism P is configured so that light from a LCD 36 enters the prism as being refracted at the entrance surface thereof on the second surface 33, is reflected at the fourth surface 35, then is reflected at the second reflecting surface on the second surface 33, is reflected at the third surface 34, then is reflected at the fourth reflecting surface on the second surface 33, exits out of the prism as being refracted at the first surface 32 thereof, and is imaged on an image surface 31.

Figure 19:
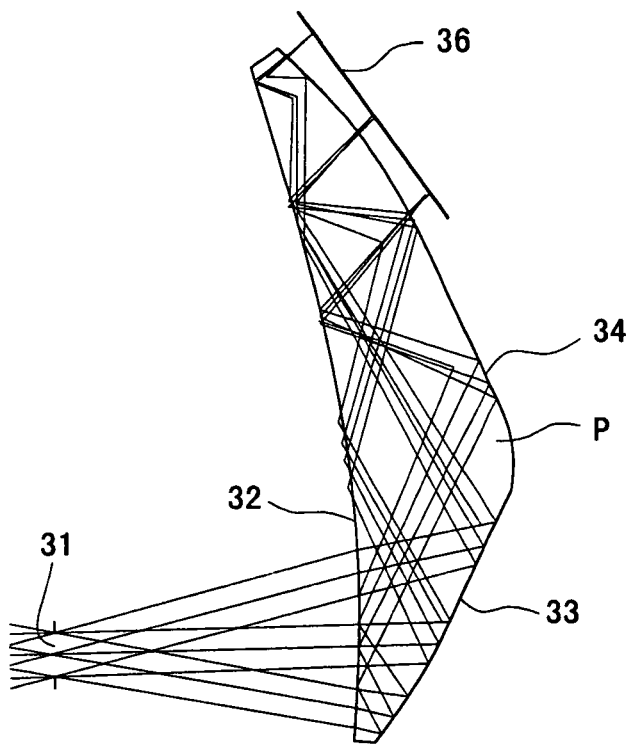
FIG. 19 shows still another example of a prism applicable to the prism member of the observation optical system according to the present invention.

In the case of FIG. 19, a prism P is provided with a first surface 32, a second surface 33, and a third surface 34. The first surface 32 is constructed and arranged to act all in one as a first reflecting surface, a third reflecting surface and an exit surface. The second surface 33 is constructed and arranged as a fourth reflecting surface. The third surface 34 is constructed and arranged to act both as an entrance surface and a second reflecting surface. The prism P is configured so that light from a LCD 36 enters the prism as being refracted at the entrance surface thereof on the third surface 34, is reflected at the first reflecting surface on the first surface 32, then is reflected at the second reflecting surface on the third surface 34, is reflected at the third reflecting surface on the first surface 32, is reflected at the second surface 33, then exits out of the prism as being refracted at the exit surface thereof on the first surface 32, and is imaged on an image surface 31.

Figure 20:
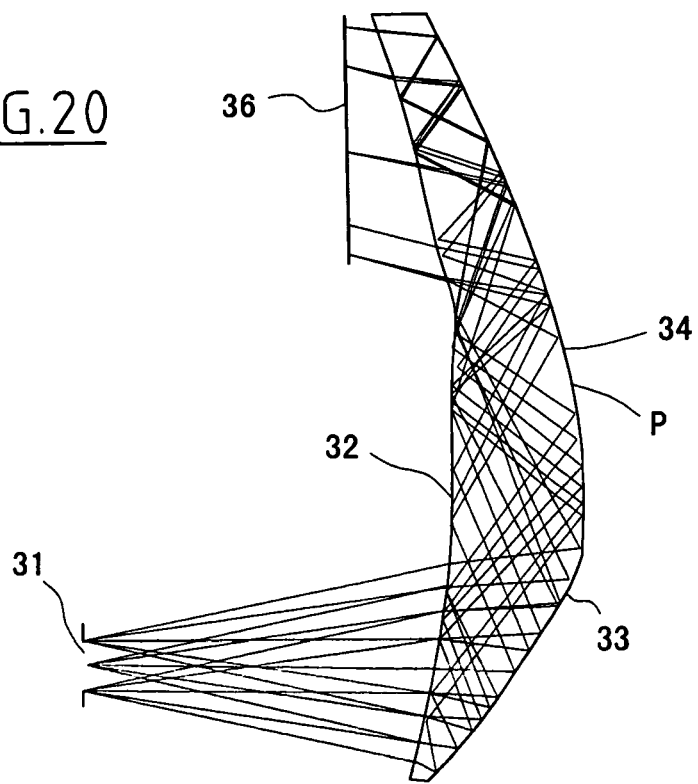
FIG. 20 shows still another example of a prism applicable to the prism member of the observation optical system according to the present invention.

In the case of FIG. 20, a prism P is provided with a first surface 32, a second surface 33, and a third surface 34. The first surface 32 is constructed and arranged to act all in one as an entrance surface, a second reflecting surface, a fourth reflecting surface and an exit surface. The second surface 33 is constructed and arranged as a fifth reflecting surface. The third surface 34 is constructed and arranged to act both as a first reflecting surface and a third reflecting surface. The prism P is configured so that light from a LCD 36 enters the prism as being refracted at the entrance surface thereof on the first surface 32, is reflected at the first reflecting surface on the third surface 34, then is reflected at the second reflecting surface on the first surface 32, is reflected at the third reflecting surface on the third surface 34, then is reflected at the fourth reflecting surface on the first surface 32, is reflected at the second surface 33, then exits out of the prism as being refracted at the exit surface thereof on the first surface 32, and is imaged on an image surface 31.

Figure 21:
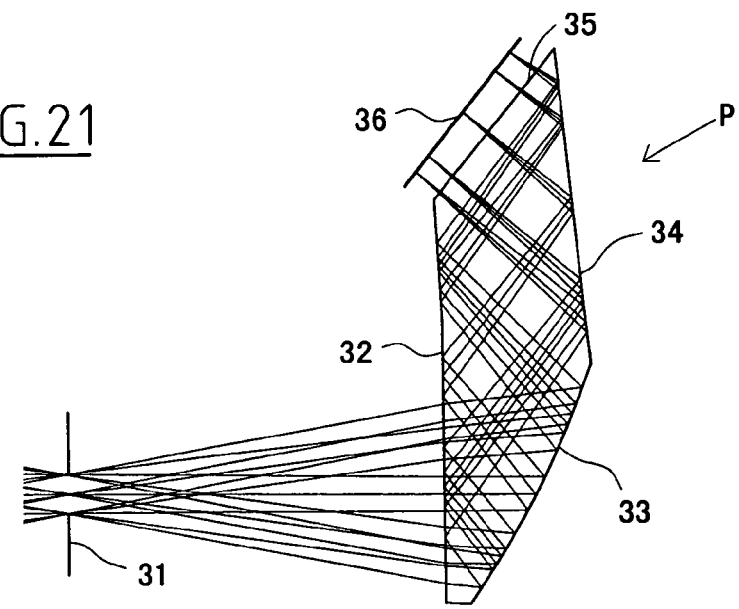
FIG. 21 shows still another example of a prism applicable to the prism member of the observation optical system according to the present invention.

In the case of FIG. 21, a prism P is provided with a first surface 32, a second surface 33, a third surface 34, and a fourth surface 35. The first surface 32 is constructed and arranged to act both as a second reflecting surface and an exit surface. The second surface 33 is constructed and arranged as a third reflecting surface. The third surface 34 is constructed and arranged as a first reflecting surface. The fourth surface 35 is constructed and arranged as an entrance surface. The prism P is configured so that light from a LCD 36 enters the prism as being refracted at the fourth surface 35 thereof, is reflected at the third surface 34, then is reflected at the second reflecting surface on the first surface 32, is reflected at the second surface 33, exits out of the prism as being refracted at the exit surface thereof on the first surface 32, and is imaged on an image surface 31.

Figure 22:
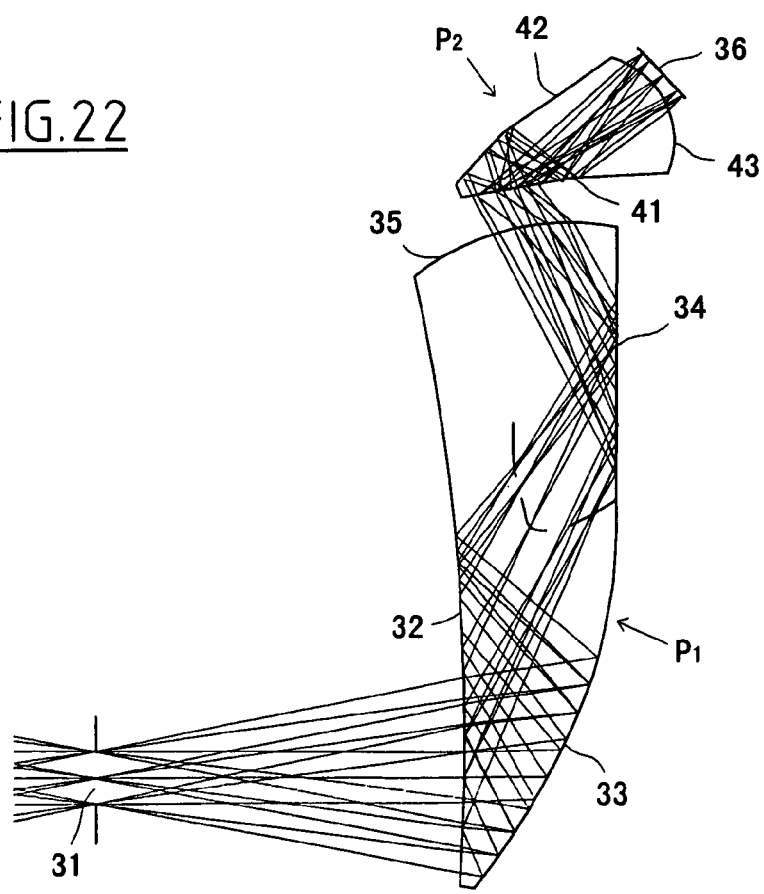
FIG. 22 shows still another example of a prism applicable to the prism member of the observation optical system according to the present invention.

In the case of FIG. 22, a prism P includes a first prism P1 and a second prism P2. The first prism P1 is provided with a first surface 32, a second surface 33, a third surface 34, and a fourth surface 35. The first surface 32 is constructed and arranged to act both as a second reflecting surface and an exit surface of the first prism P1. The second surface 33 is constructed and arranged as a third reflecting surface of the first prism P1. The third surface 34 is constructed and arranged as a first reflecting surface of the first prism P1. The fourth surface 35 is constructed and arranged as an entrance surface of the first prism P1. The second prism P2 is provided with a first surface 41, a second surface 42 and a third surface 43. The first surface 41 is constructed and arranged to act both as a first reflecting surface and an exit surface of the second prism P2. The second surface 42 is constructed and arranged as a second reflecting surface of the second prism P2. The third surface 43 is constructed and arranged as an entrance surface of the second prism P2.

The prism P is configured so that light from a LCD 36 enters the second prism P2 as being refracted at the third surface 43 thereof, is reflected at the first reflecting surface on the third surface 43, is reflected at the second surface 42, then exits out of the prism as being refracted at the first surface 41 thereof, enters the prism P1 as being refracted at the fourth surface 35 thereof, is reflected at the third surface 34, then is reflected at the second reflecting surface on the first surface 32, is reflected at the second surface 33, then exits out of the prism as being refracted at the exit surface thereof on the first surface 32, and is imaged on an image surface 31.

Figure 23:
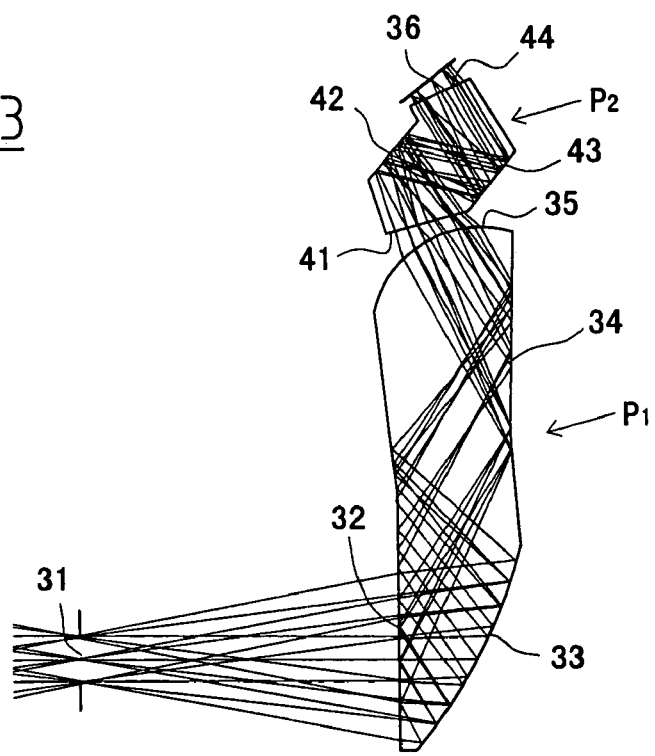
FIG. 23 shows still another example of a prism applicable to the prism member of the observation optical system according to the present invention.

In the case of FIG. 23, a prism P includes a first prism P1 and a second prism P2. The first prism P1 is provided with a first surface 32, a second surface 33, a third surface 34, and a fourth surface 35. The first surface 32 is constructed and arranged to act both as a second reflecting surface and an exit surface of the first prism P1. The second surface 33 is constructed and arranged as a third reflecting surface of the first prism P1. The third surface 34 is constructed and arranged as a first reflecting surface of the first prism P1. The fourth surface 35 is constructed and arranged as an entrance surface of the first prism P1. The second prism P2 is provided with a first surface 41, a second surface 42, a third surface 43 and a fourth surface 44. The first surface 41 is constructed and arranged as an exit surface of the second prism P2. The second surface 42 is constructed and arranged as a second reflecting surface of the second prism P2. The third surface 43 is constructed and arranged as a first reflecting surface of the second prism P2. The fourth surface 44 is constructed and arranged as an entrance surface of the second prism P2.

The prism P is configured so that light from a LCD 36 enters the second prism P2 as being refracted at the fourth surface 44 thereof, is reflected at the third surface 43, is reflected at the second surface 42, exits out of the prism as being refracted at the first surface 41 thereof, then enters the first prism P1 as being refracted at the fourth surface 35 thereof, is reflected at the third surface 34, then is reflected at the second reflecting surface on the first surface 32, is reflected at the second surface 33, then exits out of the prism as being refracted at the exit surface thereof on the first surface 32, and is imaged on an image surface 31.

Figure 24:
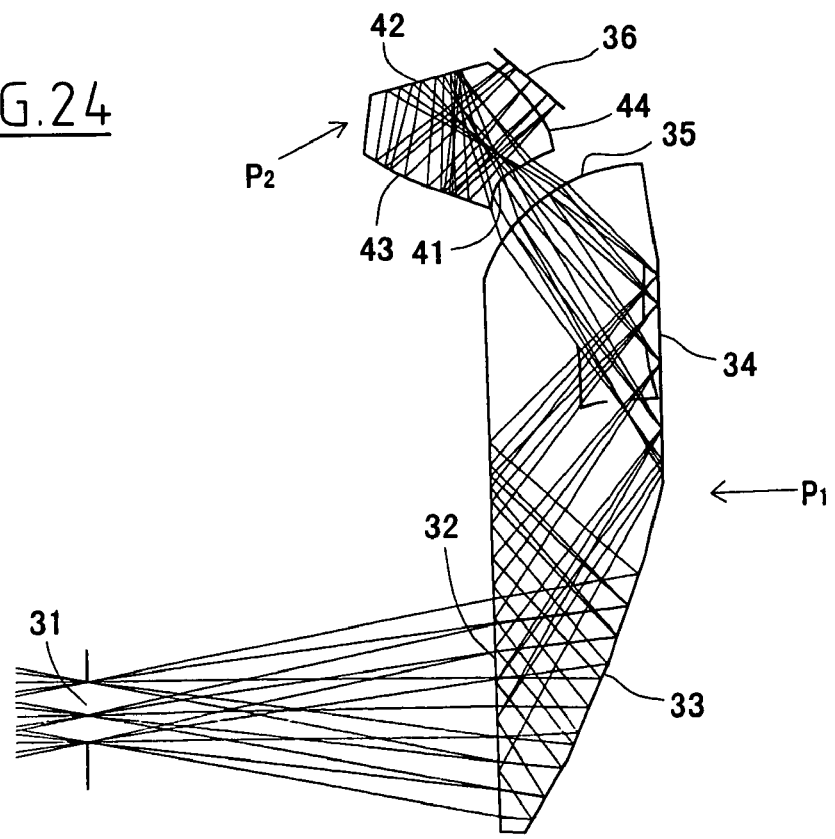
FIG. 24 shows still another example of a prism applicable to the prism member of the observation optical system according to the present invention.

In the case of FIG. 24, a prism P includes a first prism P1 and a second prism P2. The first prism P1 is provided with a first surface 32, a second surface 33, a third surface 34, and a fourth surface 35. The first surface 32 is constructed and arranged to act both as a second reflecting surface and an exit surface of the first prism P1. The second surface 33 is constructed and arranged as a third reflecting surface of the first prism P1. The third surface 34 is constructed and arranged as a first reflecting surface of the first prism P1. The fourth surface 35 is constructed and arranged as an entrance surface of the first prism P1. The second prism P2 is provided with a first surface 41, a second surface 42, a third surface 43 and a fourth surface 44. The first surface 41 is constructed and arranged as an exit surface of the second prism P2. The second surface 42 is constructed and arranged as a second reflecting surface of the second prism P2. The third surface 43 is constructed and arranged as a first reflecting surface of the second prism P2. The fourth surface 44 is constructed and arranged as an entrance surface of the second prism P2.

The prism P is configured so that light from a LCD 36 enters the prism P2 as being refracted at the fourth surface 44 thereof, is reflected at the third surface 43, is reflected at the second surface 42, exits out of the prism as being refracted at the first surface 41 thereof, then enters the first prism P1 as being refracted at the fourth surface 35 thereof, is reflected at the third surface 34, then is reflected at the second reflecting surface on the first surface 32, is reflected at the second surface 33, then exits out of the prism as being refracted at the exit surface thereof on the first surface 32, and is imaged on an image surface 31. The prism of FIG. 15 and the prism of FIG. 16 show the following difference in configuration. Regarding the path between the third surface and the fourth surface and the path between the first surface and the second surface in the second prism P2, they do not intersect each other according to FIG. 23, while they do intersect each other according to FIG. 24.

Next, descriptions will be made of the modes in which the above-described image observation optical system according to the present invention is reduced into realization in an image display apparatus.

As an example, a head-mount type binocular image display apparatus is explained in reference to FIG. 25 and FIG. 26. As shown in FIG. 26, this apparatus is configured to use the observation optical system according to the present invention as an eyepiece optical system 100 provided with an image display element 1. A pair of such eyepiece optical systems 100 are provided and held spaced away from each other by the interpupillary distance, to form a stationary-type or portable-type image display apparatus such as a head-mount type image display apparatus for binocular observation.

The above-described observation optical system is used in a main frame 102 of the image display apparatus as an eyepiece optical system 100. A pair of such eyepiece optical systems 100 are provided as left and right systems. Image display elements 1 constructed of liquid crystal display elements are disposed on the respective image surfaces of the optical systems. As shown in FIG. 25, side-head frames 103 are coupled to the main frame 102 on the lateral sides thereof so as to hold the main frame 102 in front of the eyes of the observer. A cover member 91 is disposed between the exit pupil of the eyepiece optical system 100 and the first optical member 2. The cover member 91 may be any one of a plane parallel plate, a positive lens and a negative lens. It may be constructed of a spectacle lens.

Also, each of the side-head frame 103 is equipped with a speaker 104 so that the observer can enjoy stereophony, in addition to the image. The main frame 102 provided with the speakers 104 as described above is connected with a player unit 106 for a portable video cassette or the like via a video/audio transmission cord 105. The observer can enjoy image and sound upon holding the player unit 106 to an arbitrary position, for example to her or his waist belt position, as shown in the drawing. In FIG. 25, the reference numeral 107 represents a control section including a switch, a volume control etc. of the player unit 106. Electronic devices such as video processing and audio processing circuits are built in the main frame 102.

The end of the cord 105 may be formed as a jack to be plugged in an existing video deck etc. Also, the cord 105 may be connected with a TV tuner, which receives broadcasting waves, for observation of TV programs, or may be connected with a computer to receive images of computer graphics or text messages. Alternatively, the apparatus may be provided with an antenna for receiving external signals carried by radio waves, for the purpose of removing the cord, which is obstructive.

Also, as shown in FIG. 27, the observation optical system according to the present invention may be applied to a head-mount type monocular image display apparatus, which is designed so that an eyepiece optical system is held in front of either eye (in the drawing, in front of the left eye) of an observer. In this configuration, a main frame 102 which is provided with a set including an eyepiece optical system 100 and an image display element 5 is mounted on a front frame 108 at a position in front of the corresponding eye. Side-head frames 103 shown in the figure are coupled to the front frame 108 on the lateral sides thereof so as to hold the main frame 102 in front of the odd eye of the observer. Other features are similar to those of the foregoing binocular configurations shown in FIGS. 25, 26 and thus explanation about them is omitted here.

Figure 28:
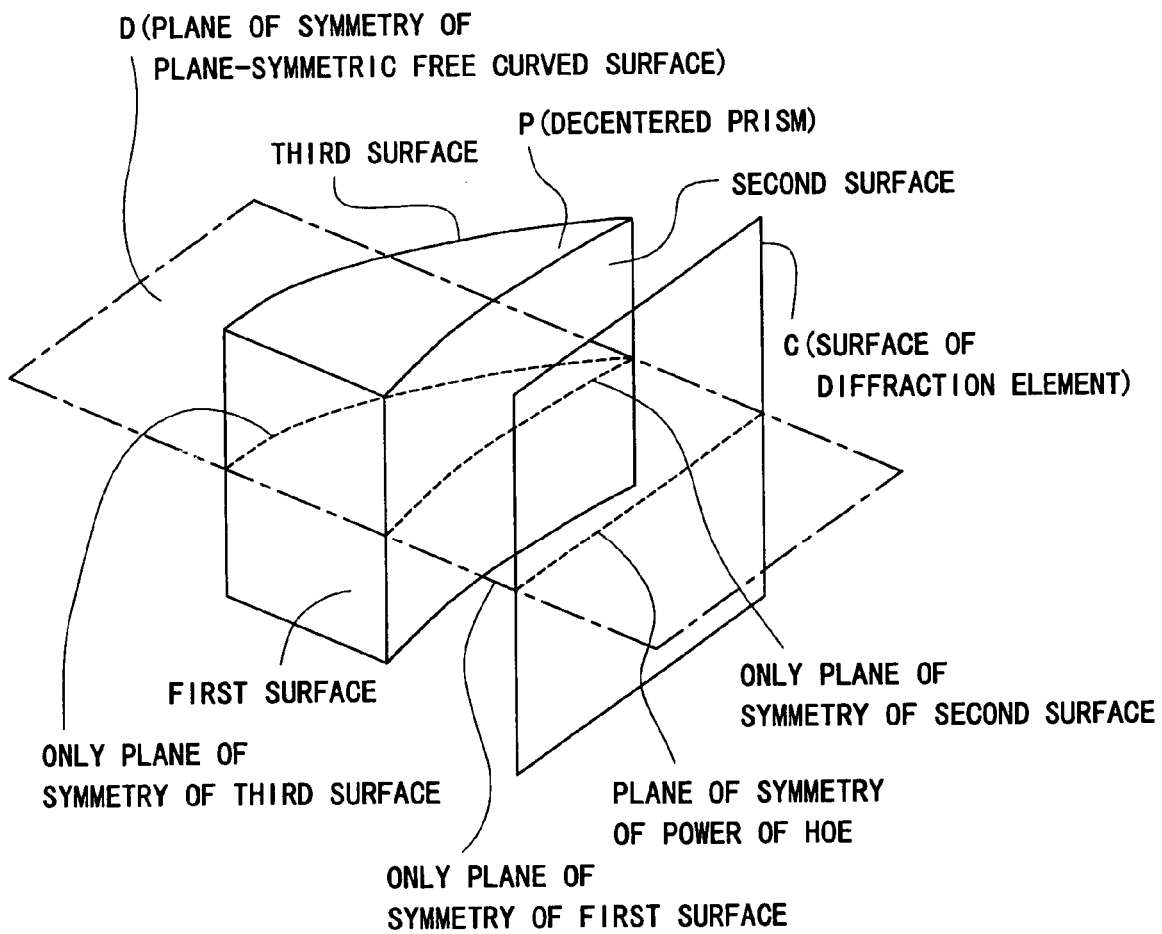
FIG. 28 shows a desirable arrangement of the prism and the diffraction element in the first unit according to the present invention.
Figure 29:
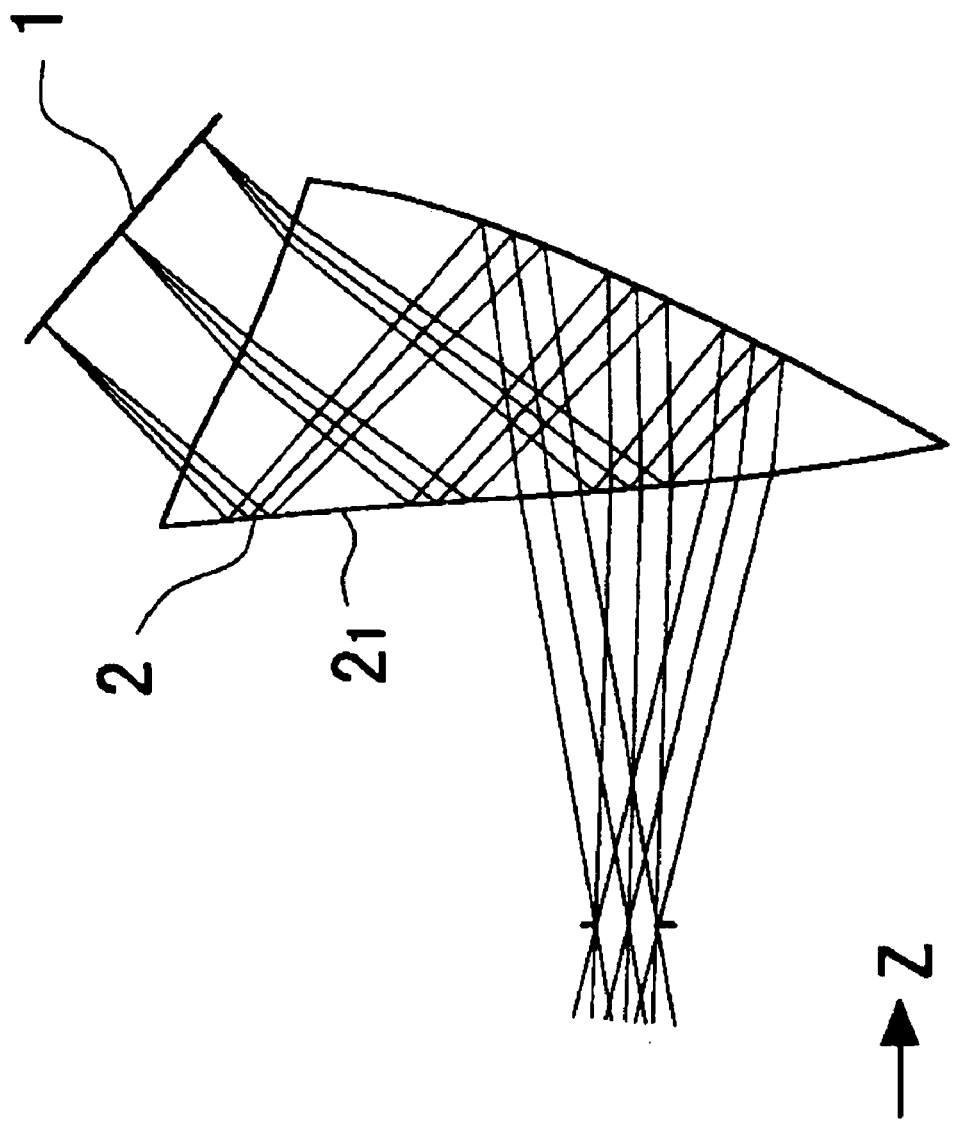
FIG. 29 shows a configuration example of an observation optical system in an image display apparatus.
Figure 30:
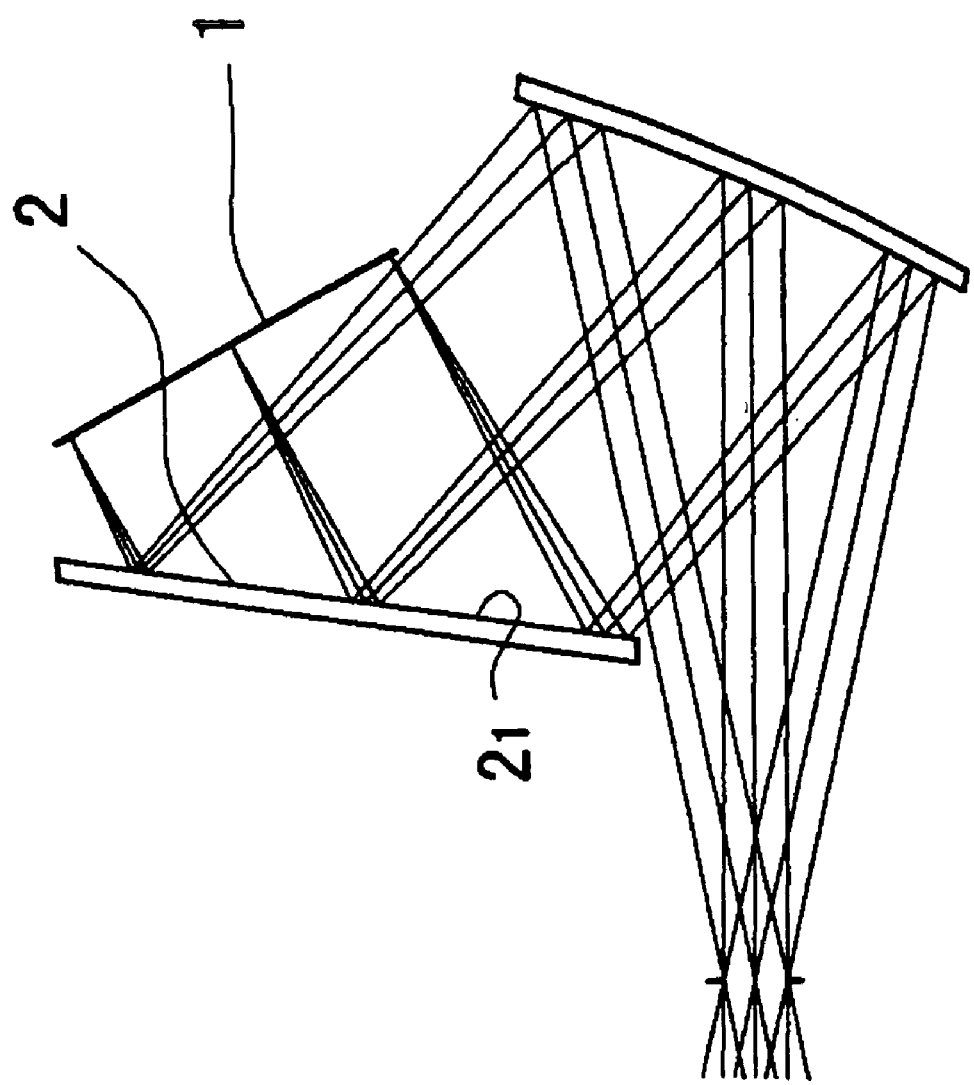
FIG. 30 shows another configuration example of an observation optical system in an image display apparatus.

Next, in reference to FIG. 28, a desirable arrangement in combining a diffraction element and a prism according to the present invention is explained. In the drawing, a decentered prism P corresponds to the prism included in the observation optical system of the present invention. In the case where a surface C of the diffraction element is shaped quadrangular as shown in the drawing, it is desirable, for beautiful image forming, to make arrangement so that a plane of symmetry D of a plane-symmetric free curved surface on the decentered prism P is parallel to at least one side of the quadrangular surface C of the diffraction element.

Furthermore, if the surface C of the diffraction element forms a regular square or a rectangle with all of its interior angles being substantially 90°, it is desirable to make arrangement so that the plane of symmetry D of the plane-symmetric free curved surface is parallel to two opposite sides of the surface C and that the plane of symmetry D coincides with a horizontal or vertical plane of symmetry of the surface C of the diffraction element. Such an arrangement facilitates assembly accuracy and thus is effective for mass production.

Furthermore, if a plurality or all of optical surfaces constituting the decentered prism P such as the first surface, the second surface, and the third surface are plane-symmetric free curved surfaces, it is desirable, in view of design convenience and in aberration performance also, to make arrangement so that the planes of symmetry of all of the plane-symmetric surfaces are arranged on the common plane D. It is also desirable to satisfy the above-mentioned relationship between the plane of symmetry D and a plane of symmetry of power of HOE of the diffraction element.

As discussed above, according to the present invention, it is possible to provide an image display apparatus which is reduced in weight while maintaining a good image quality.

What is claimed is:

1. An image display apparatus comprising:
an image display element;
an observation optical system which has a positive refracting power and which forms an exit pupil for observation of an image displayed on the image display element; and a frame member supporting the image display element and the observation optical system and having a clip section, the clip section being removably attachable to a user's spectacle frame,
wherein the observation optical system comprises:
a first unit comprising at least one prism member having a positive refracting power; and
a second unit comprising a diffraction element that is given a lens function by diffraction effect,
wherein the prism member has an entrance surface via which bundles of rays emergent from the image display element enter the prism member, at least one reflecting surface that reflects the bundles of rays inside the prism member, and an exit surface via which the bundles of rays exit out of the prism member, and
wherein the diffraction element is arranged to satisfy:

$0.5 < \beta/\beta' < 1.5$ where $\beta$ is an incident angle of a ray along an optical axis emergent from the exit surface of the prism member on the diffraction element, and $\beta'$ is an emergent angle of the ray from the diffraction element.

2. An observation optical system according to claim 1, wherein the at least one reflecting surface of the prism member has a curved surface shape to exert a power on bundles of rays, the curved surface shape being configured as a rotationally asymmetric shape to compensate for aberrations generated by decentering, and wherein the second unit of the observation optical system has an action of canceling chromatic aberration generated in the first unit.

3. An image display apparatus comprising:
an image display element;
an observation optical system which has a positive refracting power and which forms an exit pupil for observation of an image displayed on the image display element; and
a frame member supporting the image display element and the observation optical system and having a clip section, the clip section being removably attachable to a user's spectacle frame,
wherein the observation optical system comprises:
a first unit comprising at least one prism member having a positive refracting power; and
a second unit comprising a diffraction element that is given a lens function by diffraction effect,
wherein the prism member has an entrance surface via which bundles of rays emergent from the image display element enter the prism member, at least one reflecting surface that reflects the bundles of rays inside the prism member, and an exit surface via which the bundles of rays exit out of the prism member, and
wherein the diffraction element is arranged to be substantially perpendicular to a ray along an optical axis emergent from the diffraction element to enter a user's pupil.

4. An observation optical system according to claim 3, wherein the at least one reflecting surface of the prism member has a curved surface shape to exert a power on bundles of rays, the curved surface shape being configured as a rotationally asymmetric shape to compensate for aberrations generated by decentering, and wherein the second unit of the observation optical system has an action of canceling chromatic aberration generated in the first unit.

* * * * *